(12) United States Patent
Irri et al.

(10) Patent No.: US 9,946,405 B2
(45) Date of Patent: Apr. 17, 2018

(54) INFORMATION PROCESSING DEVICE

(71) Applicant: Semiconductor Energy Laboratory Co., Ltd., Atsugi-shi, Kanagawa-ken (JP)

(72) Inventors: Philip Irri, Kanagawa (JP); Julian Lindblad, Kanagawa (JP)

(73) Assignee: Semiconductor Energy Laboratory Co., Ltd., Atsugi-shi, Kawagawa-ken (JP)

( * ) Notice: Subject to any disclaimer, the term of this patent is extended or adjusted under 35 U.S.C. 154(b) by 127 days.

(21) Appl. No.: 14/723,579

(22) Filed: May 28, 2015

(65) Prior Publication Data

US 2015/0346897 A1    Dec. 3, 2015

(30) Foreign Application Priority Data

May 29, 2014   (JP) .................. 2014-111367
Jul. 29, 2014   (JP) .................. 2014-153660

(51) Int. Cl.
G06F 3/042 (2006.01)
G06F 3/041 (2006.01)

(52) U.S. Cl.
CPC ............ G06F 3/042 (2013.01); G06F 3/0418 (2013.01)

(58) Field of Classification Search
CPC .............................. G06F 3/042; G06F 3/0418
USPC ....................................... 345/175; 178/18.09
See application file for complete search history.

(56) References Cited

U.S. PATENT DOCUMENTS

| | | | |
|---|---|---|---|
| 5,303,322 A | 4/1994 | Winston et al. | |
| 5,905,583 A | 5/1999 | Kawai et al. | |
| 6,747,638 B2 | 6/2004 | Yamazaki et al. | |
| 7,271,835 B2 | 9/2007 | Iizuka et al. | |
| 7,351,949 B2 | 4/2008 | Oon et al. | |
| 7,525,523 B2 | 4/2009 | Yamazaki et al. | |
| 7,663,165 B2 | 2/2010 | Mouli | |

(Continued)

FOREIGN PATENT DOCUMENTS

| | | |
|---|---|---|
| JP | 2009-187342 A | 8/2009 |
| JP | 2012-008541 A | 1/2012 |

OTHER PUBLICATIONS

Adi Abileah et al.; "Oprtical Sensors Embedded within AMLCD Panel: Design and Applications"; Proceedings EDT '07 Proceedings of the 2007 workshop on Emerging displays technologies; 5 pages; Jan. 1, 2007.

(Continued)

*Primary Examiner* — Adam J Snyder
(74) *Attorney, Agent, or Firm* — Fish & Richardson P.C.

(57) ABSTRACT

A program includes first to fourth steps. The first step includes a step of fetching a first sensor image at the time when a light unit is lighting and a second sensor image at the time when the light unit is not lighting. The second step includes a step of calculating a third image by calibrating the first sensor image using a first calibration image; and a step of calculating a fourth image by calibrating the second sensor image using a second calibration image. The third step includes a step of calculating fifth to seventh images using the third image and the fourth image; and a step of calculating an eighth image by obtaining a weighted average of the fifth to the seventh images in accordance with an illumination and a display image. The fourth step includes a step of calculating touch data using the eighth image.

5 Claims, 22 Drawing Sheets

(56) References Cited

U.S. PATENT DOCUMENTS

| | | |
|---|---|---|
| 8,772,701 B2 | 7/2014 | Kurokawa et al. |
| 2005/0233494 A1 | 10/2005 | Hong |
| 2006/0157760 A1 | 7/2006 | Hayashi et al. |
| 2006/0170658 A1* | 8/2006 | Nakamura ............... G06F 3/042 345/173 |
| 2006/0192766 A1* | 8/2006 | Nakamura ............ G06F 3/0421 345/173 |
| 2006/0214892 A1* | 9/2006 | Harada ................ G06F 3/0412 345/81 |
| 2006/0227120 A1 | 10/2006 | Eikman |
| 2007/0013646 A1* | 1/2007 | Harada ................ G06F 3/0421 345/102 |
| 2007/0018075 A1 | 1/2007 | Cazaux et al. |
| 2007/0046640 A1* | 3/2007 | Oon ...................... G06F 3/0421 345/173 |
| 2008/0054319 A1 | 3/2008 | Mouli |
| 2008/0055266 A1* | 3/2008 | Harada ................ G06F 3/0421 345/173 |
| 2008/0211787 A1* | 9/2008 | Nakao ................. G06F 3/0412 345/175 |
| 2008/0231564 A1* | 9/2008 | Harada ................... G06F 3/042 345/81 |
| 2009/0091554 A1 | 4/2009 | Keam |
| 2009/0101948 A1 | 4/2009 | Park et al. |
| 2009/0295769 A1 | 12/2009 | Yamazaki et al. |
| 2010/0045811 A1* | 2/2010 | Harada ................ G06F 3/0412 345/173 |
| 2010/0117991 A1 | 5/2010 | Koyama et al. |
| 2010/0182282 A1 | 7/2010 | Kurokawa et al. |
| 2010/0220077 A1* | 9/2010 | Fukunaga ............ G06F 3/0412 345/175 |
| 2010/0289755 A1 | 11/2010 | Zhu et al. |
| 2010/0308737 A1 | 12/2010 | Hilgers |
| 2011/0109593 A1* | 5/2011 | Kurokawa ............ G06F 3/0412 345/175 |
| 2011/0122111 A1 | 5/2011 | Brown et al. |
| 2012/0001955 A1 | 1/2012 | Yamazaki et al. |
| 2012/0044223 A1 | 2/2012 | Tamura |
| 2013/0009888 A1* | 1/2013 | Park ........................ G06F 3/041 345/173 |
| 2013/0057527 A1* | 3/2013 | Tanaka ................. G06F 3/0412 345/207 |
| 2014/0240294 A1 | 8/2014 | Kurokawa et al. |

OTHER PUBLICATIONS

Philip Irri et al.; "Image processing for in-cell optical touchscreens"; MIRU2014: The 17th Meeting on Image Recognition and Understanding; 2 pages; Jul. 28, 2014.

Kohei Tanaka et al.; "45.5: A System LCD with Optical Input Function using Infra-Red Backlight Subtraction Scheme"; SID Digest '10 : SID International Symposium Digest of Technical Papers; pp. 680-683; Jan. 1, 2010.

Sanghun Jeon et al.; "180nm Gate Length Amorphous InGaZnO Thin Film Transistor for High Density Image Sensor Applications"; IEDM 10: Technical Digest of International Electron Devices Meeting; pp. 504-507; Dec. 6, 2010.

\* cited by examiner

FIG. 10A
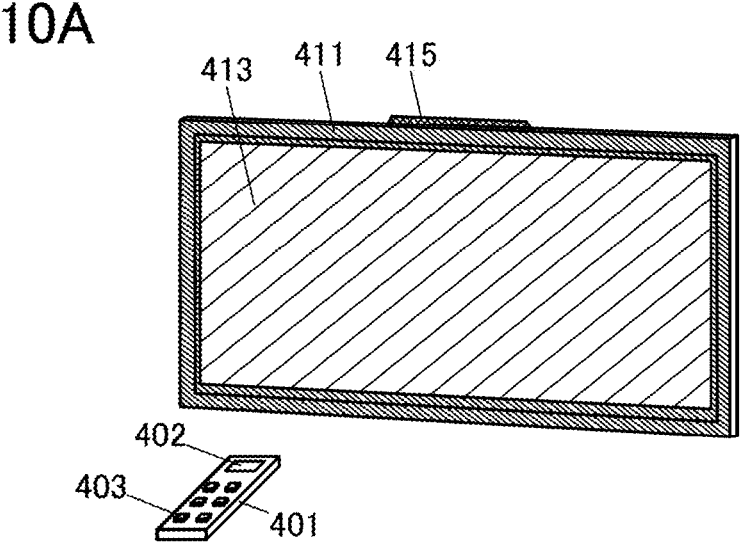
FIG. 10B1
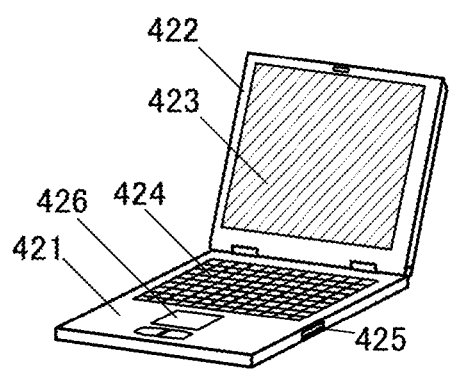
FIG. 10B2
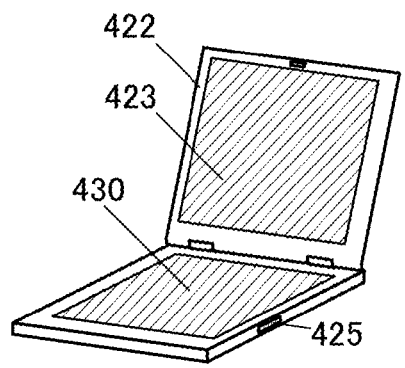
FIG. 10C
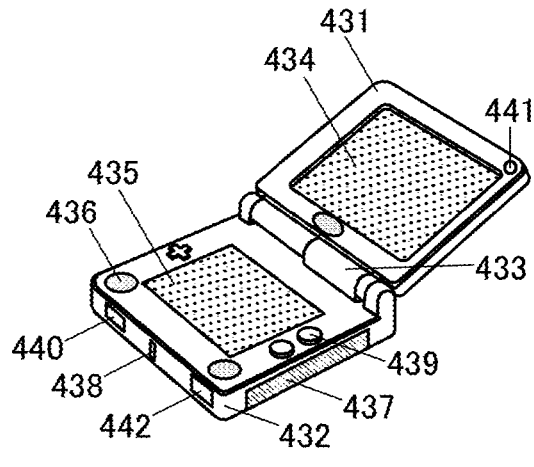
FIG. 10D
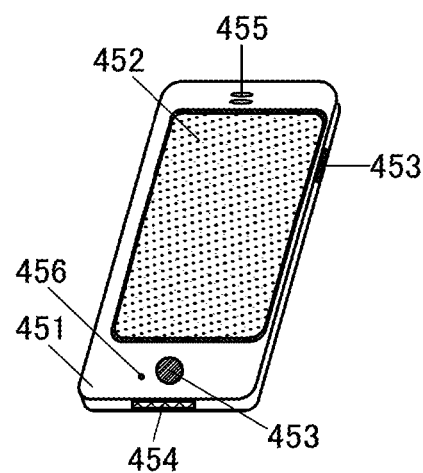

INFORMATION PROCESSING DEVICE

BACKGROUND OF THE INVENTION

1. Field of the Invention

One embodiment of the present invention relates to a program and an information processing device.

Note that one embodiment of the present invention is not limited to the above technical field. One embodiment of the invention disclosed in this specification and the like relates to an object, a method, or a manufacturing method. One embodiment of the present invention relates to a machine, a process, manufacture, or a composition of matter. In particular, the present invention relates to, for example, a semiconductor device, a storage device, a processor, a display device, a light-emitting device, an input device, an input/output device, a sensing device, a lighting device, a power storage device, a manufacturing method thereof, or a driving method thereof.

2. Description of the Related Art

In rapid development of mobile electronic devices, input technique of data by a touch panel or the like plays an important role.

In particular, optical touch panels using photo sensor units serving as touch panels have been attracting attentions. For example, a semiconductor device in which a photo sensor unit and a display unit are provided in different regions can control the display state of the display unit based on a data signal generated by the photo sensor unit. For example, when a user touches the display unit with his/her finger, the photo sensor unit senses the position of the finger based on a data signal generated by the photo sensor unit, so that the photo sensor unit can serve as a touch panel.

Non-patent document 1 discloses an example of information processing flow by which a touch position is sensed in an optical touch panel.

Ambient light (light in an ambience where the photo sensor unit is located) enters the photo sensor unit. Thus, ambient light might influence a data signal produced by the photo sensor unit, thereby causing difficulties in the sensing of a touch position.

Patent Document 1 discloses a method of suppressing adverse effects of ambient light in a touch panel, in which the state of a light unit included in a semiconductor device is switched between a lighting state and a non-lighting state, and in each period of the lighting state and non-lighting state, data is produced by a photo sensor unit and a data signal is produced by obtaining a difference between the two produced data signals.

REFERENCE

Patent Document

[Patent Document 1] Japanese Published Patent Application No. 2012-008541

Non-Patent Document

[Non-patent document 1] Adi Abileah and Patrick Green, "Optical Sensors Embedded within AMLCD Panel: Design and Applications," ACM SIGGRAPH 2007

SUMMARY OF THE INVENTION

Optical touch panels, which are easily affected by ambient light as described above, are also affected by a display image. Accordingly, a program that determines a touch position more stably in various ambient light and during display of various images, or an information processing device having the program are demanded.

One embodiment of the present invention has at least one object of the following: to provide a program that can extract input data more stably; to provide a program that can extract input data with higher accuracy; to provide a more convenient information processing device; and a provide a novel information processing device.

Note that the description of these objects do not disturb the existence of other objects. Note that in one embodiment of the present invention, there is no need to achieve all the objects. Other objects will be apparent from and can be derived from the description of the specification, the drawings, and the claims.

(1) One embodiment of the present invention is a program including first to fourth steps. The first step includes a step of fetching a first sensor image at the time when a light unit is lighting and a second sensor image at the time when the light unit is not lighting. The second step includes a step of calculating a third image by calibrating the first sensor image using a first calibration image; and a step of calculating a fourth image by calibrating the second sensor image using a second calibration image. The third step includes a step of calculating fifth to seventh images using the third image and the fourth image; and a step of calculating an eighth image by obtaining a weighted average of the fifth to the seventh images in accordance with an illumination and a display image. The fourth step includes a step of calculating touch data using the eighth image.

(2) Another embodiment of the present invention is a program including first to fourth steps. The first step includes a step of fetching a first sensor image at the time when a light unit is lighting and a second sensor image at the time when the light unit is not lighting. The second step includes a step of calculating a third image by calibrating the first sensor image using a first calibration image; and a step of calculating a fourth image by calibrating the second sensor image using a second calibration image. The third step includes a step of calculating fifth to seventh images using the third image and the fourth image; a step of calculating an eighth image by obtaining a weighted average of the sixth and the seventh images in accordance with an illumination; a step of fetching a display image; a step of calculating a ninth image by converting the display image into a gray scale; and a step of calculating a tenth image by obtaining a weighted average of the fifth and the eighth images in accordance with the ninth image. The fourth step includes a step of calculating touch data using the tenth image.

(3) Another embodiment of the present invention is a program including first to fourth steps. The first step includes a step of fetching a first sensor image at the time when a light unit is lighting and a second sensor image at the time when the light unit is not lighting. The second step includes a step of calculating a third image by calibrating the first sensor image using a first calibration image; and a step of calculating a fourth image by calibrating the second sensor image using a second calibration image. The third step includes a step of calculating a fifth image by normalizing a difference between the third and the fourth images; a step of calculating a sixth image by normalizing the third image; a step of calculating a seventh image by normalizing the fourth image; a step of calculating an eighth image by obtaining a weighted average of the sixth and the seventh images in accordance with an illumination; a step of fetching a display image; a step of calculating a ninth image by converting the display image into a gray scale; and a step of calculating a tenth image by obtaining a weighted average of the fifth and the eighth images in accordance with the ninth image. The fourth step includes a step of calculating touch data using the tenth image.

(4) Another embodiment of the present invention is a program including first to fourth steps. The first step includes a step of fetching a first sensor image at the time when a light unit is lighting and a second sensor image at the time when the light unit is not lighting. The second step includes a step of calculating a third image by calibrating the first sensor image using a first calibration image; and a step of calculating a fourth image by calibrating the second sensor image using a second calibration image. The third step includes a step of calculating a fifth image by normalizing a difference between the third and the fourth images; a step of calculating a sixth image by normalizing the third image; a step of calculating a seventh image by normalizing the fourth image; a step of calculating an eighth image by obtaining a weighted average of the sixth and the seventh images assuming that the weights of the sixth and the seventh images are 1 and 0, respectively, in the case where an illumination is lower than the threshold illumination and are 0 and 1, respectively, in the other cases; a step of fetching a display image; a step of calculating a ninth image by converting the display image into a gray scale; and a step of calculating a tenth image by obtaining a weighted average of the fifth and the eighth images in accordance with the value of the ninth image such that the weights of the fifth and the eight images are 1 and 0, respectively, in a white display portion and the weights of the fifth and the eighth images are 0 and 1, respectively, in a black display portion. The fourth step includes a step of calculating touch data using the tenth image.

(5) Another embodiment of the present invention is a program including first to third steps. The first step includes a step of fetching a sensor image at the time when a light unit is not lighting. The second step includes a step of calculating a first image by deducting a calibration image from the sensor image. The third step includes a step of calculating a second image by smoothing the first image; a step of finding the brightest component in the second image; a step of calculating estimated first and second illuminations using the value of the brightest component; a step of fetching a display image; a step of calculating a third image by converting the display image into a gray scale; and a step of calculating an estimated third illumination by obtaining a weighted average of the estimated first and second illuminations in accordance with the coordinates of the brightest component and the third image.

Another embodiment of the present invention is a program including the program of any one of the embodiments (1) to (4) as a first program and the program of the embodiment (5) as a second program. In the first program, the estimated illumination calculated in the second program is used.

(6) Another embodiment of the present invention is the program of the embodiment (1) including fifth to seventh steps. The fifth step includes a step of fetching a third sensor image at the time when the light unit is not lighting. The sixth step includes a step of calculating a ninth image by deducting a third calibration image from the third sensor image. The seventh step includes a step of calculating a tenth image by smoothing the ninth image; a step of finding the brightest component in the tenth image; a step of calculating estimated first and second illuminations using the value of the brightest component; a step of calculating an eleventh image by converting the display image into a gray scale; and a step of calculating an estimated third illumination by obtaining a weighted average of the estimated first and second illuminations in accordance with the coordinates of the brightest component and the eleventh image. The estimated third illumination is used as the illumination.

(7) Another embodiment of the present invention is the program of the embodiment (2) including fifth to seventh steps. The fifth step includes a step of fetching a third sensor image at the time when the light unit is not lighting. The sixth step includes a step of calculating an eleventh image by deducting a third calibration image from the third sensor image. The seventh step includes a step of calculating a twelfth image by smoothing the eleventh image; a step of finding the brightest component in the twelfth image; a step of calculating estimated first and second illuminations using the value of the brightest component; and a step of calculating an estimated third illumination by obtaining a weighted average of the estimated first and second illuminations in accordance with the coordinates of the brightest component and the ninth image. The estimated third illumination is used as the illumination.

(8) Another embodiment of the present invention is an information processing device including a memory and an execution unit. The memory includes a program, and the execution unit conducts the program. The program includes first to fourth steps. The first step includes a step of fetching a first sensor image at the time when a light unit is lighting and a second sensor image at the time when the light unit is not lighting. The second step includes a step of calculating a third image by calibrating the first sensor image using a first calibration image; and a step of calculating a fourth image by calibrating the second sensor image using a second calibration image. The third step includes a step of calculating fifth to seventh images using the third image and the fourth image; and a step of calculating an eighth image by obtaining a weighted average of the fifth to the seventh images in accordance with an illumination and a display image. The fourth step includes a step of calculating touch data using the eighth image.

(9) Another embodiment is an information processing device including an optical touch panel and a storage portion in which the program of any one of the embodiments (1) to (7) is stored.

A program that can extract input data more stably can be provided. Furthermore, a program that can extract input data with higher accuracy can be provided. Furthermore, an information processing device with improved convenience can be provided. Furthermore, a novel information processing device can be provided.

Note that the description of these effects does not disturb the existence of other effects. One embodiment of the present invention does not necessarily have all the effects listed above. Other effects will be apparent from and can be derived from the description of the specification, the drawings, the claims, and the like.

BRIEF DESCRIPTION OF THE DRAWINGS

In the accompanying drawings.

FIGS. 10A, 10B1, 10B2, 10C, and 10D illustrate information processing devices of embodiments of the present invention;

DETAILED DESCRIPTION OF THE INVENTION

Figure 1A:
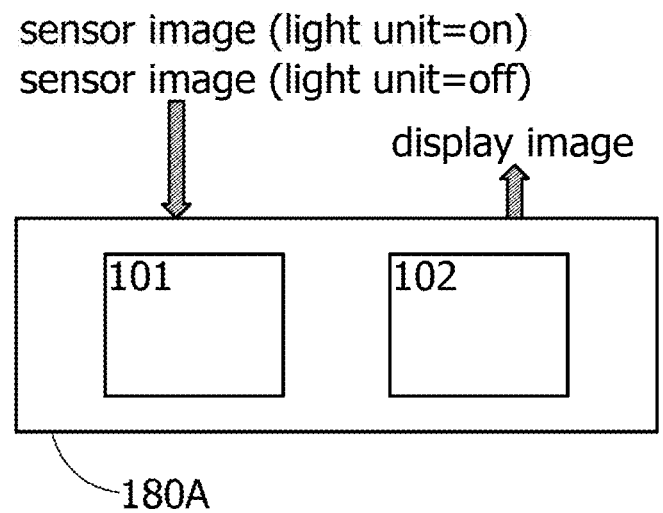
FIGS. 1A and 1B are block diagrams of information processing devices of embodiments of the present invention.

Embodiments and an example of the present invention will be described in detail with the reference to the drawings. However, the present invention is not limited to the description below, and it is easily understood by those skilled in the art that modes and details disclosed herein can be modified in various ways. Furthermore, the present invention is not construed as being limited to the description of the embodiments and example. In describing structures of the present invention with reference to the drawings, common reference numerals are used for the same portions in different drawings. Note that the same hatched pattern is applied to similar parts, and the similar parts are not especially denoted by reference numerals in some cases.

Note that the size, the thickness of films (layers), or regions in drawings is sometimes exaggerated for simplicity.

Note that the ordinal numbers such as "first" and "second" are used for the sake of convenience and do not denote the order of steps or the stacking order of layers. Therefore, for example, description can be given even when "first" is replaced with "second" or "third", as appropriate. In addition, the ordinal numbers in this specification and the like are not necessarily the same as those which specify one embodiment of the present invention.

In this specification, an element X is abbreviated as X in some cases. A quantity Y is abbreviated as Y in some cases. Examples of the element include a wiring, a signal line, a power supply line, a circuit, an element, a conductor, an insulator, and a film. Examples of the quantity include a variable, a function, and a parameter. For example, an illumination "illum" is simply referred to as "illum" in some cases. A function "norm" is simply referred to as "norm" in some cases. A signal line SL is simply referred to as SL in some cases.

Embodiment 1

In this embodiment, a program and an information processing device of one embodiment of the present invention will be described with reference to drawings.

Structural examples of information processing devices of embodiments of the present invention will be described with reference to FIGS. 1A and 1B and FIG. 2.

FIG. 1A is a block diagram illustrating the structure of an information processing device 180A.

The information processing device 180A illustrated in FIG. 1A includes an execution unit 101 and a memory 102. The following two sensor images that are output from a photo sensor unit outside the device are input to the information processing device 180A: a sensor image when a light unit outside the device is lighting (sensor image (light unit=on)) and a sensor image at the time when the light unit is not lighting (sensor image (light unit=off)). The information processing device 180A outputs display images to be input to a display unit outside the device. A program of one embodiment of the present invention for processing the sensor images is stored in the memory 102. The execution unit 101 is configured to execute the above program.

The execution unit 101 is, for example, an arithmetic logic unit (ALU). The memory 102 is, for example, a cache memory. In another example, the execution unit 101 may be a central processing unit (CPU). The memory 102 may be a main memory unit.

The information processing device 180A is connected to an optical touch panel, and is capable of calculating touch data such as a touch position by using the program stored in the memory 102, for example.

Figure 1B:
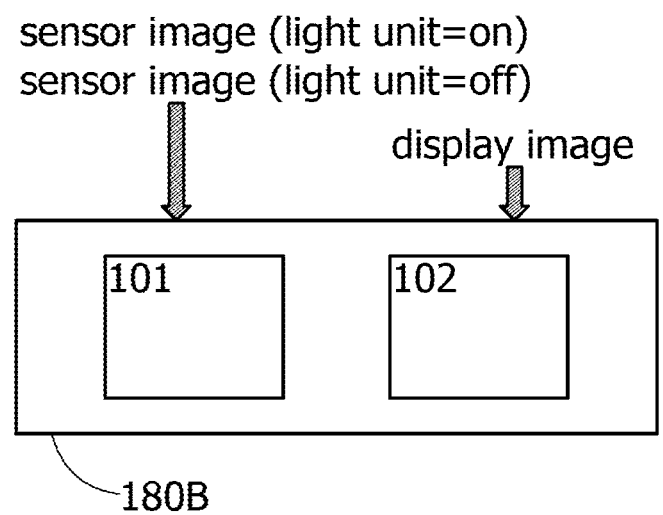

FIG. 1B is a block diagram illustrating the structure of an information processing device 180B. The information processing device 180B in FIG. 1B differs in only input/output of display images from the information processing device 180A in FIG. 1A. Accordingly, for the other structure, the description of that of the information processing device 180A in FIG. 1A can be referred to as appropriate. Display images are output from the information processing device 180A in FIG. 1A, whereas display images are input to the information processing device 180B shown in FIG. 1B. This means that the information processing device 180A in FIG. 1A produces the display images, whereas the information processing device 180B in FIG. 1B does not. Since the program of one embodiment of the present invention is configured to refer to display images, when the information processing device 180B does not produce the display images, the display images are configured to be externally input.

Figure 2:
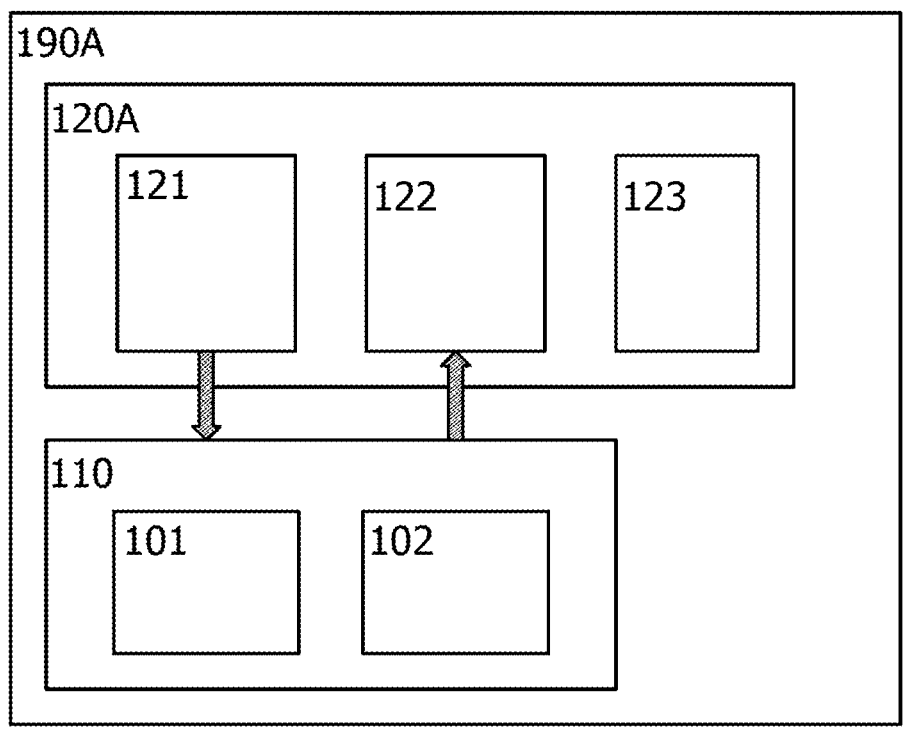
FIG. 2 is a block diagram of an information processing device of one embodiment of the present invention.

FIG. 2 is a block diagram illustrating the structure of an information processing device 190A.

The information processing device 190A in FIG. 2 includes a display and photo sensor unit (display & PS unit) 120A and an information processing unit 110. The display and photo sensor unit 120A includes a photo sensor unit 121, a display 122 and a light unit 123. The information processing unit 110 includes an execution unit 101 and a memory 102. The following two sensor images which are output from the photo sensor unit 121 are input to the information processing unit 110: a sensor image at the time when the light unit 123 is lighting and a sensor image at the time when the light unit is not lighting. The information processing unit 110 is configured to output display images to be input to the display 122. A program of one embodiment of the present invention for processing the sensor images is stored in the memory 102. The execution unit 101 is configured to execute the above program.

The photo sensor unit 121 includes cells two-dimensionally arranged. Each cell, for example, includes a photodiode and has a function of producing a voltage in accordance with the illumination of incident light. A display 122 includes pixels two-dimensionally arranged. Each pixel includes, for example, sub-pixels displaying respective colors of red, green, and blue. Each sub-pixel includes, for example, a liquid crystal element. The light unit 123, for example, functions as a backlight of a liquid crystal display unit.

The display 122 may include, for example, a light-emitting element instead of a liquid crystal element. The light-emitting element refers to an element whose luminance is controlled with a current or a voltage. As the light-emitting element, an electroluminescent element (also referred to as an EL element) or the like can be used.

The term "light unit" in this specification refers to a light emission unit provided with a light source and having a function of lighting when the light source emits light. For example, a backlight used in the case where a display unit includes a liquid crystal element is a light unit. A white light-emitting diode or a light-emitting diode that emit more than one color can be used as a light source of the light unit. For example, a display unit that includes a light-emitting element is a light unit, for the display unit itself is provided with the light source. In the case where a display unit includes a light-emitting element, a light unit is not necessarily provided separately from the display unit.

The information processing device 190A, for example, is provided with an optical touch panel, and can calculate touch data such as a touch position by using the program stored in the memory 102.

Next, examples of programs of embodiments of the present invention will be described with reference to FIG. 3A to FIG. 8 and FIG. 18.

Figure 3A:
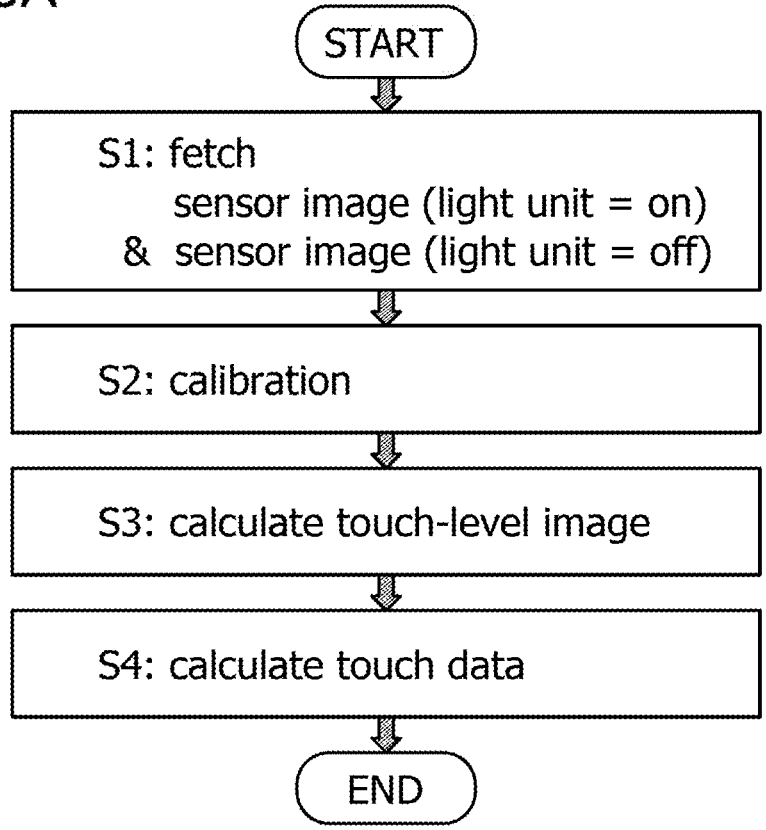
FIGS. 3A and 3B show flow charts of programs of embodiments of the present invention.
Figure 3B:
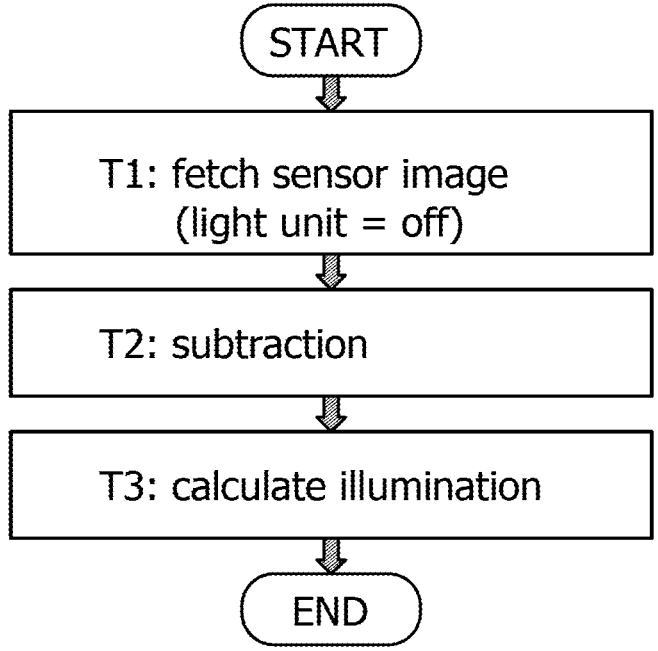

FIGS. 3A and 3B are examples of flow charts for explaining programs of embodiments of the present invention. FIG. 3A is an example of a flow chart for explaining Program P1 with which touch data such as a touch position can be calculated. FIG. 3B is an example of a flow chart for explaining Program P2 with which illumination under ambient light can be estimated. When touch data such as a touch position is calculated by using Program P1, the illumination under the ambient light is used. The illumination calculated by using Program P2 can be used as the illumination under the ambient light.

The flow chart shown in FIG. 3A includes Steps S1, S2, S3 and S4.

In Step S1, a sensor image at the time when the light unit is lighting and a sensor image at the time when the light unit is not lighting are fetched.

In Step S2, the fetched two sensor images are calibrated. The calibration is performed on each of the two sensor images. The calibration is executed by using a sensor image for the calibration. The calibration is executed by using an independent standard value for each cell.

In Step S3, an image containing a touch level is calculated by using the two calibrated sensor images. The above calculation is executed by using the illumination and a display image. As the illumination, the illumination under the ambient light or its estimated value is used.

In Step S4, the touch data such as a touch position is calculated by using the images containing touch levels.

The information processing performed according to the above steps enables calculation of the touch data such as a touch position. In particular, a stable calculation of the touch data can be executed by using the illumination under the ambient light and/or the display image as well as the sensor image at the time when the light unit is lighting and the sensor image at the time when the light unit is not lighting.

The flow chart shown in FIG. 3B includes Steps T1, T2, and T3.

In Step T1, a sensor image at the time when the light unit is not lighting is obtained.

In Step T2, a background sensor image is deducted from the obtained sensor image.

The background sensor image can be obtained under the darkest ambient light when the display image is entirely black and the light unit is not lighting. The processing of Step T2 can reduce an influence caused by a defect and/or a variation of the photo sensor unit.

In Step T3, an estimated illumination under ambient light is calculated by using the sensor image from which the background sensor image has been deducted.

The information processing performed according to the above steps enables estimation of the illumination under ambient light.

The flow charts shown in FIG. 3A and FIG. 3B will be described in more detail.

Figure 4:
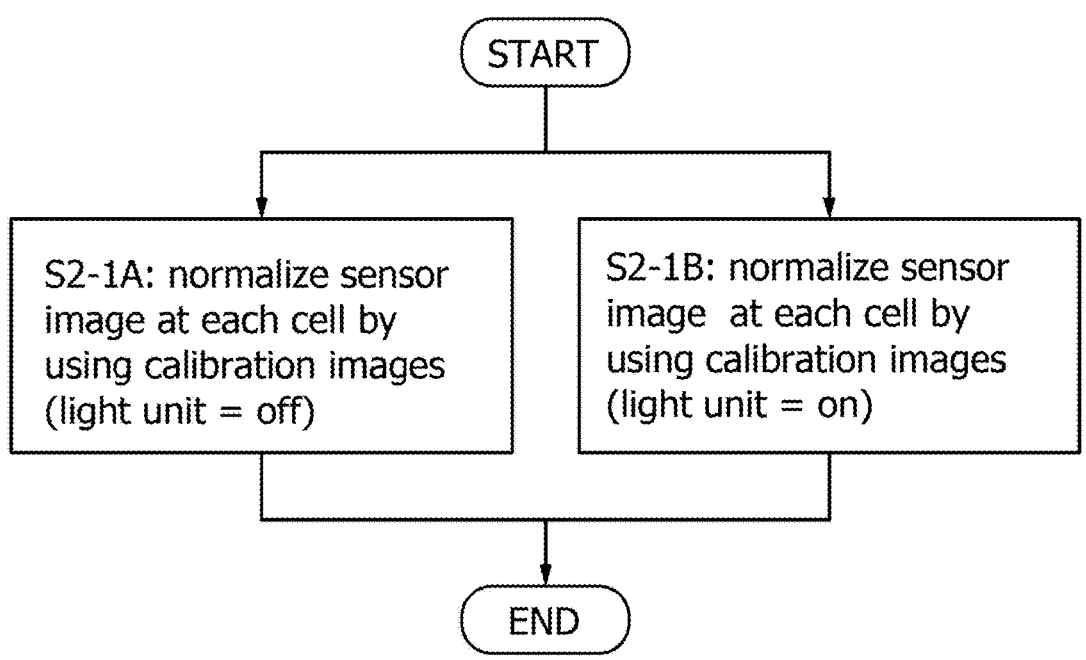
FIG. 4 is a flow chart of a program of one embodiment of the present invention.

FIG. 4 is an example of a flow chart for explaining Step S2 (calibration). The flow chart in FIG. 4 includes Steps S2-1A and S2-1B.

At the start of Step S2, the sensor image at the time when the light unit is lighting and the sensor image at the time when the light unit is not lighting are obtained. The sensor image at the time when the light unit is lighting is expressed as a set of sensor input values $si\_on(c)$ for each cell. The sensor image at the time when the light unit is not lighting is expressed as a set of sensor input values $si\_off(c)$ for each cell. Note that sensor input means data read from a cell. A sensor input value means its value. The parameter c means a coordinate of the cell.

In Step S2-1A, the sensor images at the time when the light unit is not lighting are normalized by using a sensor image for calibration.

Examples of the sensor image for calibration are sensor images obtained under two kinds of ambient light when the lighting unit is not lighting and the display image is entirely white. The two kinds of ambient light may be, for example, the brightest ambient light supposed as the user's circumstance (hereinafter simply referred to as the brightest ambient light), and the darkest ambient light supposed as the user's circumstance (hereinafter simply referred to as the darkest ambient light). Assume that the sensor input value obtained under the brightest ambient light is $si\_off\_l(c)$ and the sensor input value obtained under the darkest ambient light is $si\_off\_d(c)$. In the following description, it is supposed that $si\_off\_d(c) < si\_off\_l(c)$ at any normal cell.

An example of a function for normalization will be described. The function for normalization returns a value that is greater than or equal to s0 and less than or equal to s1 with the function $si\_off(c)$ as a parameter (s0 and s1 are real numbers). For example, the function is an increasing function when si_off(c) is a value between si_off_d(c) and si_off_l(c). It returns s0 when si_off(c) is equal to si_off_d (c), and returns s1 when si_off(c) is equal to si_off_l(c).

If a function fn(x) is an increasing function, f(x1)≤fn(x2) is satisfied when x1<x2. If a function fn(x) is a decreasing function, fn(x1)≤fn(x2) is satisfied when x1<x2.

When si_off(c) is smaller than si_off_d(c) in a specified cell, the cell may be labeled as a defective cell. In that case, for example, the defective cell may be distinguished or excluded at the calculation of the touch data. When si_off(c) is smaller than si_off_d(c), the function may return s0.

When si_off(c) is larger than si_off_l(c) in a specified cell, the cell may be labeled as a defective cell. In that case, for example, the defective cell may be distinguished or excluded at the calculation of the touch data. When si_off(c) is larger than si_off_l(c), the function may return s1.

A specific example of a function for normalization is shown. The function for normalization can be a function norm1 shown in Mathematical Formula 1 where si_off(c), si_off_d(c), and si_off_l(c) are substituted for x, x0, and x1, respectively.

[Mathematical Formula 1]

$$norm1(x) = \begin{cases} s0 & \text{for } x < x0 \\ s1 & \text{for } x1 < x \\ s0 + (s1 - s0) \cdot f\left(\frac{x - x0}{x1 - x0}\right) & \text{for } x0 \leq x \leq x1 \end{cases} \quad (1)$$

Here, a function f is, for example, an identity function. The function f may be a nonlinear increasing function that converts a value of 0 or more and 1 or less into a value of 0 or more and 1 or less.

Another specific example of a function for normalization is shown. The function for normalization can be a function norm2 shown in Mathematical Formula 2 where si_off(c), si_off_d(c), and si_off_l(c) are substituted for x, x0, and x1, respectively.

[Mathematical Formula 2]

$$norm2(x) = \begin{cases} s1 & \text{for } x1 \leq x \\ s0 + (s1 - s0) \cdot f\left(\frac{|x - x0|}{x1 - x0}\right) & \text{for } x < x1 \end{cases} \quad (2)$$

Here, a function f is, for example, an identity function. The function f may be a nonlinear increasing function that converts a value of 0 or more and 1 or less into a value of 0 or more and 1 or less.

For example, s0 may be 0, and s1 may be 1.

In Step S2-1B, the sensor images at the time when the light unit is lighting are used as the sensor images for calibration. Thus, processing similar to that in the steps S2-1A may be executed in Step S2-1B except for this difference.

In this way, the calibrated sensor images are calculated.

Furthermore, in Step S2-1A, sensor images subjected to two kinds of calibration can be obtained by using as sensor images for calibration four sensor images obtained under two kinds of ambient light when a black image is displayed and when a white image is displayed. The two kinds of ambient light may be, for example, the brightest ambient light and the darkest ambient light.

For example, a sensor input value obtained under the brightest ambient light when a black image is displayed is si_off_lb(c), and a sensor input value obtained under the brightest ambient light when a white image is displayed is si_off_lw(c). A sensor input value obtained under the darkest ambient light when a black image is displayed is si_off_db (c), and a sensor input value obtained under the darkest ambient light when a white image is displayed is si_off_dw (c).

In a normal cell, the above calculation is performed supposing that si_off_dw(c)<si_off_lw(c) and si_off_db(c) <si_off_lb(c) are satisfied. A calibrated sensor image calib_off_black is generated by using si_off_lb(c) and si_off_db(c). In a similar manner, a calibrated sensor image calib_off_white is generated by using si_off_lw(c) and si_off_dw(c).

Furthermore, Step S2-1B is similar to Step S1-1A. Two calibrated sensor images can be generated by using as sensor images for calibration four sensor images obtained under the brightest light and the darkest light when a black image or a white image is displayed.

In Step S2-1B, a sensor input value obtained under the brightest ambient light when a black image is displayed is si_on_lb(c), and a sensor input value obtained under the brightest ambient light when a white image is displayed is si_on_lw(c). A sensor input value obtained under the darkest ambient light when a black image is displayed is si_on_db (c), and a sensor input value obtained under the darkest ambient light when a white image is displayed is si_on_dw (c).

In a normal cell, the above calculation is performed supposing that si_on_dw(c)<si_on_lw(c) and si_on_db(c) <si_on_lb(c) are satisfied. A calibrated sensor image calib_on_black is generated by using si_on_lb(c) and si_on_db(c). A calibrated sensor image calib_on_white is generated by using si_on_lw(c) and si_on_dw(c).

The above description is given supposing that si_off_d (c)<si_off_l(c). This relation depends on a method for reading out sensor images. It is needless to say that calibration can be conducted in a similar way even when the inequality sign is reversed.

An example will be described in which si_off_d(c)>si_off_l(c) is satisfied in a normal cell. In this case, the function for normalization can be, for example, a function norm3 shown in Mathematical Formula 3 where si_off(c), si_off_d(c), and si_off_l(c) are substituted for x, x0, and x1, respectively.

[Mathematical Formula 3]

$$norm3(x) = \begin{cases} s0 & \text{for } x0 < x \\ s1 & \text{for } x < x1 \\ s0 + (s1 - s0) \cdot f\left(\frac{x - x0}{x1 - x0}\right) & \text{for } x1 \leq x \leq x0 \end{cases} \quad (3)$$

Here, a function f is, for example, an identity function. The function f may be a nonlinear increasing function that converts a value of 0 or more and 1 or less into a value of 0 or more and 1 or less.

The above processing in Step S2 is performed, whereby calibration using different reference values for respective cells can be performed by using the sensor images for calibration. As a result, a defective cell can be labelled to prevent any influence in the subsequent processing even if the defective cell is included in the photo sensor unit. In addition, the influence of variations in characteristics among the cells included in the photo sensor unit can be reduced.

The above processing in Step S2 enables the calibration depending on the use environment. As a result, the program enables more precise and/or more stable calculation of the touch data.

In Step S2 described above, the calibration of the sensor images at the time when the light unit is not lighting and the calibration of the sensor images at the time when the light unit is lighting are independently conducted. As a result, the program enables more precise and/or more stable calculation of the touch data.

Note that, in some cases, Step S2 can be divided into a step of determining the maximum sensor input value and/or the minimum sensor input value for each cell on the basis of the sensor images for calibration and a step of normalizing the sensor input value of each cell by using the maximum sensor input value and/or the minimum sensor input value.

Note that, in some cases, Step S2 can be divided into a step of labeling a defective cell on the basis of the sensor images for calibration, a step of processing the sensor input value of the defective cell, and a step of processing the sensor input values of cells (also called normal cells) other than the defective cell.

Figure 18:
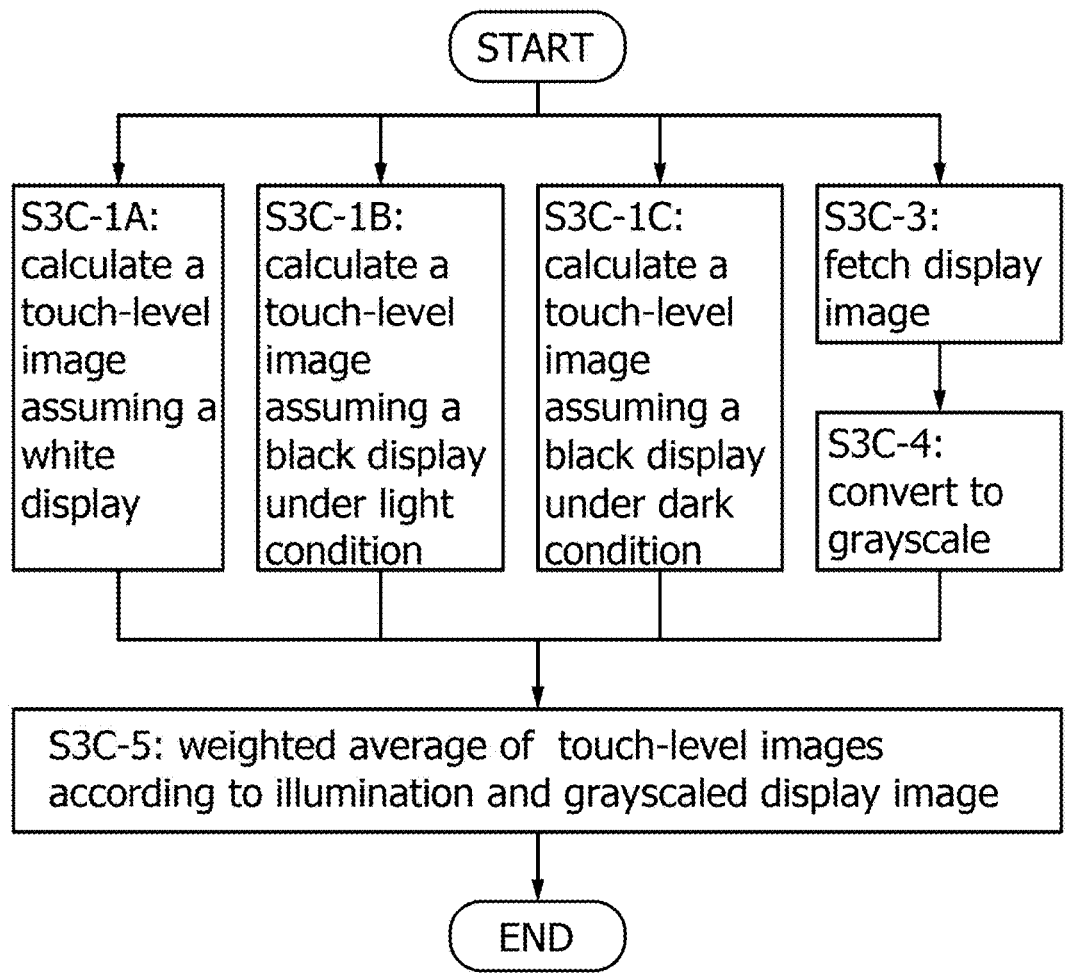
FIG. 18 is a flow chart of a program of one embodiment of the present invention.

FIG. 18 is an example of a flow chart for explaining Step S3 (calculation of images containing touch levels). The flow chart in FIG. 18 includes Steps S3C-1A, S3C-1B, S3C-1C, S3C-3, S3C-4, and S3C-5.

At the start of Step S3, the calibrated sensor images at the time when the light unit is lighting and the calibrated sensor images at the time when the light unit is not lighting are produced. When the display image is entirely white, whatever the illumination of the ambient light is, a touch level (a quantity expressing the degree of touching) can be obtained by the prescribed calculation using the above two calibrated sensor images. When the display image is entirely black, light from the light unit is blocked, so that less light from the light unit is reflected by a user's finger. In other words, information on touch levels contained in the sensor images at the time when the light unit is lighting decreases. The sensor image at the time when the light unit is not lighting contains more information on a touch level when ambient light is brighter. In contrast, when ambient light is darker, the sensor image at the time when the light unit is not lighting contains less information on a touch level. This is because the degree of the light blocking by the existence of a finger (whether a touch panel is touched) is higher when ambient light is brighter. Therefore, it is effective to take the illumination into account to extract the information on the touch level. In Step S3, the information on the touch level is extracted as above, taking the illumination of the ambient light and the display images into account.

In Step S3C-1A, an image containing a touch level is calculated by a calculating method for calculating touch levels when the display image is entirely white, using the whole or part of the two calibrated sensor images.

The foregoing image containing a touch level is expressed as a set of touch levels tl_w(c) for each cell. The touch level is a quantity expressing a degree of touching. The parameter c means a coordinate of the cell. For example, it can be 0 in the case of a standard touching state (full touching state) and 1 in the case of a standard not-touching state (no touching state). The full touching state may be, for example, a state of being actually touched under a real environment. The no touching state may be, for example, a state of being actually not touched under a real environment. Either of them may be a virtual state, which is decided by adjusting parameters adequately.

In Step S3C-1B, an image containing a touch level is calculated by a calculating method for calculating touch levels when the display image is entirely black under the brightest ambient light, using the whole or part of the two calibrated sensor images. The foregoing image containing a touch level is expressed as a set of touch levels tl_bl(c) for each cell.

In Step S3C-1C, an image containing a touch level is calculated by a calculating method for calculating touch levels when the display image is entirely black under the darkest ambient light, using the whole or part of the two calibrated sensor images. The foregoing image containing a touch level is expressed as a set of touch levels tl_bd(c) for each cell.

In Step S3C-3, a display image is obtained.

In Step S3C-4, the obtained display image is converted into a gray scale.

The display image is expressed by a set of display output values to be output to pixels. In the case where each pixel includes sub-pixels of red, green, and blue, the display output values can be expressed as do_red(p), do_green(p), and do_blue(p), which are the display output values of the sub-pixels of red, green, and blue, respectively. A parameter p represents a coordinate of the pixel. In the case of an 8-bit grayscale, do_red(p), do_green(p), and do_blue(p) are each an integer of 0 to 255 inclusive.

The conversion into a grayscale may be performed using appreciate weight for each color. For example, a value gdo(p) obtained by converting the display output value of the pixel into a grayscale can be expressed as follows: gdo(p) w_red·do_red(p)+w_green·do_green(p)+w_blue·do_blue(p). The values w_red, w_green, and w_blue are weights of red, green, and blue, respectively, in conversion into a grayscale.

In Step S3C-5, a weighted average of the image containing a touch level calculated in Step S3C-1A, the image containing a touch level calculated in Step S3C-1B, and the image containing a touch level calculated in Step S3C-1C is obtained in accordance with an illumination illum and the display image converted into a grayscale. As the illumination illum, an illumination under ambient light or the estimate thereof is used. As a result, an image containing a touch level can be calculated in consideration of actual ambient light and a display image.

The value of the display image converted into a grayscale varies depending on the cell; thus, the cells have different weights.

In Step S3, the estimated illumination under ambient light calculated using Program P2 shown in FIG. 3B can be used as the illumination illum. In the case where an illumination sensor is provided near the photo sensor unit, data obtained from the illumination sensor may be used.

For example, at a touch operation with a user's finger, the illumination may be temporarily decreased because the photo sensor unit (or the illumination sensor or the like) is overshadowed by a user's hand. For the purpose of stabilizing the illumination used in Step S3, the maximum illumination may be used among illuminations in a recent certain period of recorded previous illuminations. For example, after acquiring illuminations at intervals of 0.5 seconds, the maximum illumination among the latest five illuminations may be used.

In Step S3, the image containing a touch level is calculated in consideration of the image that is being displayed and the illumination under actual ambient light, with the use of the plurality of calibrated sensor images. Consequently, influences of ambient light and the display image can be more suppressed, and the image containing a touch level can be calculated more accurately or more stably.

Figure 5:
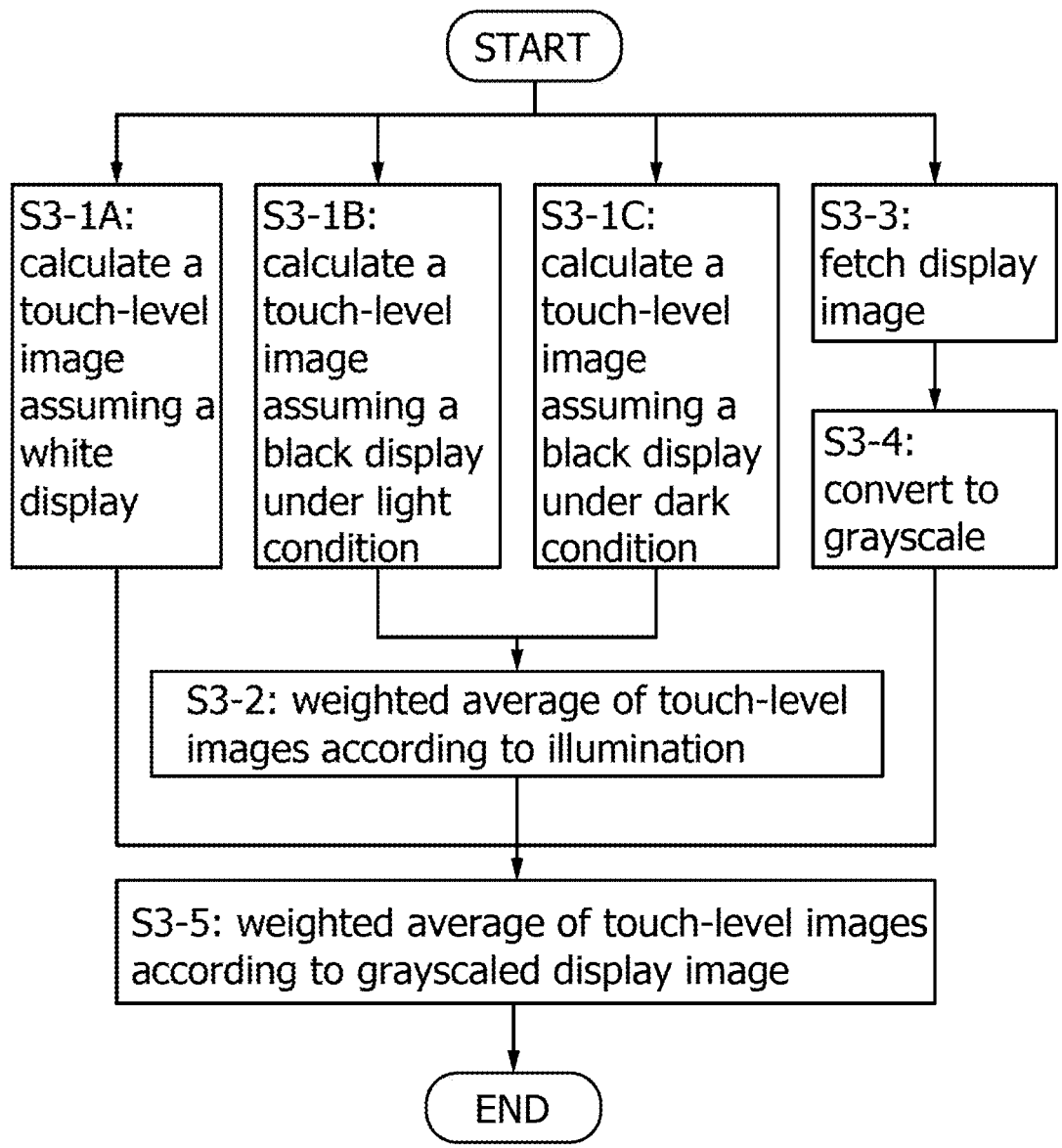
FIG. 5 is a flow chart of a program of one embodiment of the present invention.

FIG. 5 is an example of a more specific flow chart for explaining Step S3 (calculation of images containing touch levels). The flow chart in FIG. 5 includes Steps S3-1A, S3-1B, S3-1C, S3-2, S3-3, S3-4, and S3-5.

In Steps S3-1A, S3-1B, and S3-1C, processings that are the same as those in Steps S3C-1A, S3C-1B, and S3C-1C in the flow chart shown in FIG. 18 are performed. Thus, description of the flow chart in FIG. 18 can be referred to.

In Step S3-2, a weighted average of the image containing a touch level calculated in Step S3-1B and the image containing a touch level calculated in Step S3-1C is obtained in accordance with the illumination illum. As the illumination illum, an illumination under ambient light or the estimate thereof is used. As a result, an image containing a touch level can be calculated by a calculating method for calculating touch levels when the display image is entirely black based on consideration of actual ambient light. The foregoing image containing a touch level is expressed as a set of touch levels tl_b(c) for each cell.

An example of a function for a weighted average will be described. Note that the illumination under the brightest ambient light is illum_1, and the illumination under the darkest ambient light is illum_d. A function mix1(tl_bd(c), tl_bl(c); illum) for a weighted average returns a value between tl_bd(c) and tl_bl(c) in accordance with the illumination illum. For example, the function mix1 is an increasing function or a decreasing function of the illumination illum, and returns tl_bd(c) when the illumination illum is equal to illum_d and returns tl_bl(c) when the illumination illum is equal to illum_1.

In Steps S3-3 and S3-4, processings that are the same as those in Steps S3C-3 and S3C-4 in the flow chart shown in FIG. 18 are performed. Thus, description of the flow chart in FIG. 18 can be referred to.

In Step S3-5, a weighted average of the image containing a touch level calculated in Step S3-1A and the image containing a touch level calculated in Step S3-2 is obtained in accordance with the display image converted into a grayscale. As a result, an image containing a touch level can be calculated in consideration of actual ambient light and a display image.

The value obtained by conversion into a grayscale in a specified cell (coordinate c), gdoa(c), may be the value obtained by converting the display output value of one pixel the nearest to the specified cell into a grayscale or the average of the values obtained by converting the display output values of a plurality of pixels near the specified cell into grayscales. It is supposed that gdoa(c) is gdo_b when the display image is entirely black, and gdoa(c) is gdo_w when the display image is entirely white.

An example of a function for a weighted average will be described. A function mix2(tl_w(c), tl_b(c); gdoa(c)) for a weighted average returns a value between tl_w(c) and tl_b(c) in accordance with gdoa(c). For example, the function mix2 is an increasing function or a decreasing function of gdoa(c), and returns tl_w(c) when the gdoa(c) is equal to gdo_w and returns tl_b(c) when gdoa(c) is equal to gdo_b.

The function mix2 for a weighted average returns tl_w(c) in a white display portion and tl_b(c) in a black display portion. That is, a weighted average is obtained such that the weights of tl_w(c) and tl_b(c) in the white display portion are 1 and 0, respectively, and the weights of tl_w(c) and tl_b(c) in the black display portion are 0 and 1, respectively.

Another specific example of a function for a weighted average is shown. The function for a weighted average can be a function mix shown in Mathematical Formula 4 where tl_b(c), tl_w(c), gdoa(c), gdo_b, and gdo_w are substituted for y0, y1, x, x0, and x1, respectively.

[Mathematical Formula 4]

$$\mathrm{mix}(y0, y1, x) = y0 + (y1 - y0) \cdot f\left(\frac{x - x0}{x1 - x0}\right) \quad (4)$$

Here, a function f is, for example, an identity function. The function f may be a nonlinear increasing function that converts a value of 0 or more and 1 or less into a value of 0 or more and 1 or less.

In the above-described manner, the images including touch levels are calculated.

In Step S3 described above, the image containing a touch level is calculated in consideration of the image that is being displayed and the illumination under actual ambient light, with the use of the two calibrated sensor images. Consequently, influences of ambient light and the display image can be more suppressed, and the image containing a touch level can be calculated more accurately or more stably.

Figure 6:
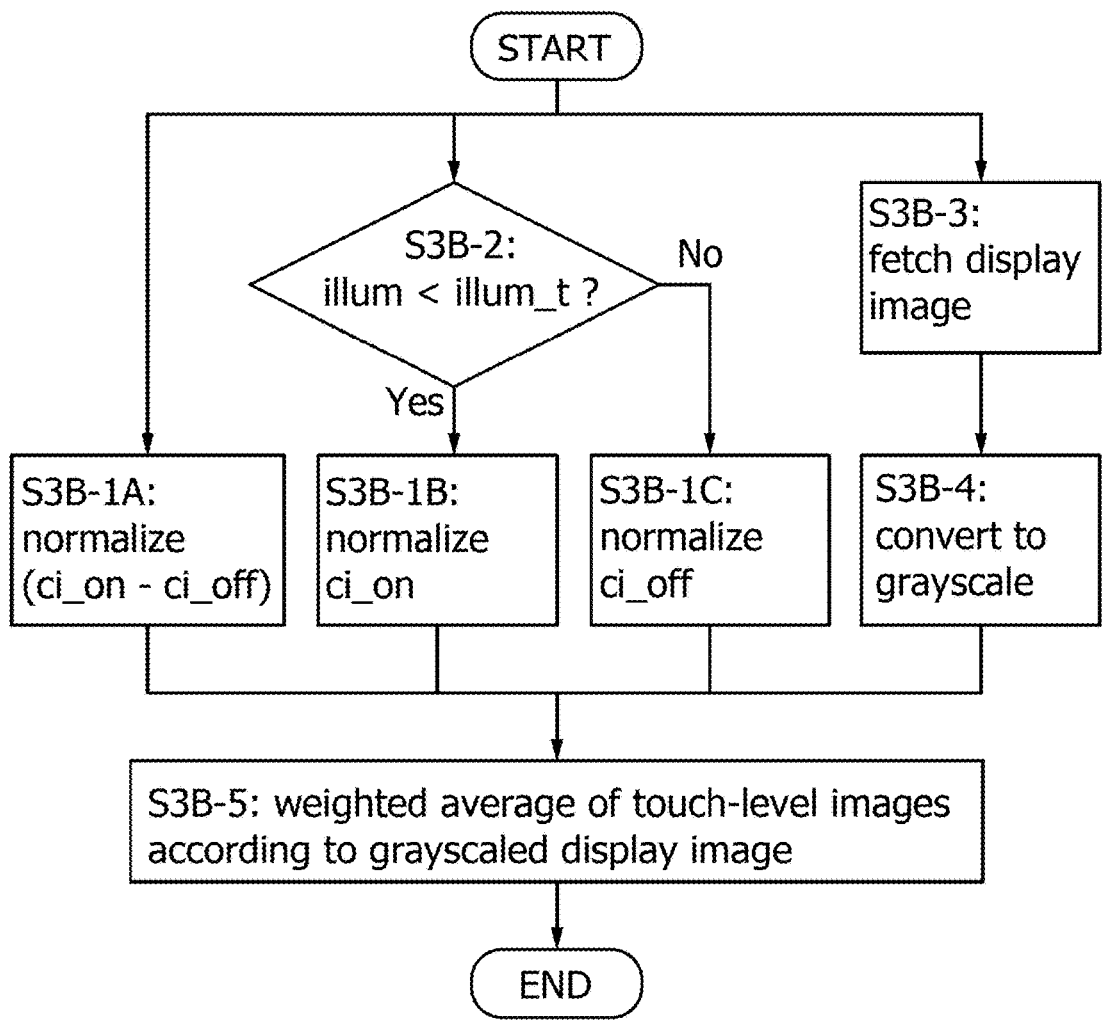
FIG. 6 is a flow chart of a program of one embodiment of the present invention.

FIG. 6 is an example of a more specific flow chart for explaining Step S3 (calculation of images containing touch levels). The flow chart in FIG. 6 includes Steps S3B-1A, S3B-1B, S3B-1C, S3B-2, S3B-3, S3B-4, S3B-5.

In Step S3B-1A, a difference $\Delta ci(c)$ between a calibrated sensor input value at the time when the light unit is lighting, ci_on(c), and a calibrated sensor input value at the time when the light unit is not lighting, ci_off(c), i.e., (ci_on(c)−ci_off(c)) is calculated to be normalized.

It is supposed that, in the full touching state, $\Delta ci(c)$ is $\Delta ci\_full$ in a cell located in a place that is touched, and in the no touching state, $\Delta ci(c)$ is $\Delta ci\_no$, when the display image is entirely white. It is also supposed that the ambient light is the brightest, for example. In the case where $\Delta ci(c)$ of the full touching state and $\Delta ci(c)$ of the no touching state depend on the location of the cell, $\Delta ci\_full$ and $\Delta ci\_no$ may be determined such that $\Delta ci(c)$ of each normal cell is between $\Delta ci\_full$ and $\Delta ci\_no$, for example.

An example of a function for normalization will be described. The function for normalization returns a value that is greater than or equal to c0 and less than or equal to c1 with the function $\Delta ci(c)$ as a parameter (c0 and c1 are real numbers). For example, the function is an increasing function or a decreasing function when $\Delta ci(c)$ is a value between $\Delta ci\_no$ and $\Delta ci\_full$. It returns c1 when $\Delta ci(c)$ is equal to $\Delta ci\_no$, and returns c0 when $\Delta ci(c)$ is equal to $\Delta ci\_full$.

When $\Delta ci(c)$ is not between $\Delta ci\_full$ and $\Delta ci\_no$ and is out of $\Delta ci\_full$, the function may return c0. When $\Delta ci(c)$ is not between $\Delta ci\_full$ and $\Delta ci\_no$ and is out of $\Delta ci\_no$, the function may return c1.

A specific example of a function for normalization is shown. Assume that $\Delta ci\_no < \Delta ci\_full$. The function for normalization can be a function norm4 shown in Mathematical Formula 5 where $\Delta ci(c)$, $\Delta ci\_full$, and $\Delta ci\_no$ are substituted for x, x0, and x1, respectively.

[Mathematical Formula 5]

$$\mathrm{norm4}(x) = \begin{cases} c0 & \text{for } x0 < x \\ c1 & \text{for } x < x1 \\ c0 + (c1 - c) \cdot f\left(\dfrac{x - x0}{x1 - x0}\right) & \text{for } x1 \le x \le x0 \end{cases} \quad (5)$$

Here, a function f is, for example, an identity function. The function f may be a nonlinear increasing function that converts a value of 0 or more and 1 or less into a value of 0 or more and 1 or less. In this manner, a contrast can be changed. Consequently, the accuracy of the calculation of touch levels can be improved in some cases.

For example, c0 may be 0, and c1 may be 1.

Note that $\Delta ci\_no$ and $\Delta ci\_full$ can be modified as parameters, as appropriate. As a result, the accuracy of the calculation of touch levels can be improved in some cases. In particular, it may be supposed that $\Delta ci\_no=0$.

For example when c0 is 0, c1 is 1, and the function f is an identity function, if $1/\Delta ci\_full$ is denoted as k, the function for normalization can be a function norm5 shown in Mathematical Formula 6 where $\Delta ci(c)$ is substituted for x.

[Mathematical Formula 6]

$$\mathrm{norm5}(x) = \begin{cases} 0 & \text{for } 1 < k \cdot x \\ 1 & \text{for } k \cdot x < 0 \\ 1 - k \cdot x & \text{for } 0 \le k \cdot x \le 1 \end{cases} \quad (6)$$

Step S3B-1A corresponds to Step S3C-1A shown in FIG. 18. The processing in Step S3B-1A is an example of a calculation method for calculating touch levels when the display image is entirely white. When the display image is entirely white, $\Delta ci(c)$ may represent a touch level. The accuracy of the calculation of touch levels can be improved by normalizing $\Delta ci(c)$ in the above-described manner.

In Step S3B-2, whether the illumination illum is smaller than a threshold illumination, illum_t is determined. As the illumination illum, an illumination under ambient light or the estimate thereof is used. When illum is smaller than illum_t, processing in Step S3B-1B is performed. Otherwise, processing Step S3B_1C is performed.

Step S3B-2 corresponds to Step S3-2 shown in FIG. 5. By selecting one of the two touch levels in accordance with the relation between the illumination illum and the threshold illumination illum_t, a weighted average of the two touch levels is obtained. This method has an advantage of reducing the amount of calculation because not both touch levels but only one of the touch levels that is selected needs to be calculated.

In Step S3B-1B, the calibrated sensor input value at the time when the light unit is lighting, ci_on(c), is normalized.

It is supposed that, in the full touching state under the darkest ambient light, ci_on(c) is ci_on_full in a cell located in a place that is touched, and in the no touching state, ci_on(c) is ci_on_no. In the case where ci_on(c) of the full touching state and ci_on(c) of the no touching state depend on the location of the cell, ci_on_full and ci_on_no may be determined such that ci_on(c) of each normal cell is between ci_on_full and ci_on_no, for example.

An example of a function for normalization will be described. The function for normalization returns a value that is greater than or equal to c0 and less than or equal to c1 with the function ci_on(c) as a parameter (c0 and c1 are real numbers). For example, the function is an increasing function or a decreasing function when ci_on(c) is a value between ci_on_no and ci_on_full. It returns c1 when ci_on (c) is equal to ci_on_no, and returns c0 when ci_on(c) is equal to ci_on_full.

When ci_on(c) is not between ci_on_full and ci_on_no and is out of ci_on_full, the function may return c0. When ci_on(c) is not between ci_on_full and ci_on_no and is out of ci_on_no, the function may return c1.

A specific example of a function for normalization is shown. Assume that ci_on_no<ci_on_full. The function for normalization can be the function norm4 shown in Mathematical Formula 5 where ci_on(c), ci_on_full, and ci_on_no are substituted for x, x0, and x1, respectively.

Here, a function f is, for example, an identity function. The function f may be a nonlinear increasing function that converts a value of 0 or more and 1 or less into a value of 0 or more and 1 or less. In this manner, a contrast can be changed. Consequently, the accuracy of the calculation of touch levels can be improved in some cases.

For example, c0 may be 0, and c1 may be 1.

Note that ci_on_no and ci_on_full can be modified as parameters, as appropriate. As a result, the accuracy of the calculation of touch levels can be improved in some cases.

Step S3B-1B corresponds to Step S3C-1B shown in FIG. 18. The processing in Step S3B-1B is an example of a calculation method for calculating touch levels when the display image is entirely black under the darkest ambient light. When the display image is entirely black under the darkest ambient light, ci_on(c) may represent a touch level. The accuracy of the calculation of touch levels can be improved by normalizing ci_on(c) in the above-described manner.

In Step S3B-1C, the calibrated sensor input value at the time when the light unit is not lighting, ci_off(c), is normalized.

It is supposed that, in the full touching state under the brightest ambient light, ci_off(c) is ci_off_full in a cell located in a place that is touched, and in the no touching state, ci_off(c) is ci_off_no. In the case where ci_off(c) of the full touching state and ci_off(c) of the no touching state depend on the location of the cell, ci_off_full and ci_off_no may be determined such that ci_off(c) of each normal cell is between ci_off_full and ci_off_no, for example.

An example of a function for normalization will be described. The function for normalization returns a value that is greater than or equal to c0 and less than or equal to c1 with the function ci_off(c) as a parameter (c0 and c1 are real numbers). For example, the function is an increasing function or a decreasing function when ci_off(c) is a value between ci_off_no and ci_off_full. It returns c1 when ci_off (c) is equal to ci_off_no, and returns c0 when ci_off(c) is equal to ci_off_full.

When ci_off(c) is not between ci_off_full and ci_off_no and is out of ci_off_full, the function may return c0. When ci_off(c) is not between ci_off_full and ci_off_no and is out of ci_off_no, the function may return c1.

A specific example of a function for normalization is shown. Assume that ci_off_full<ci_off_no. The function for normalization can be the function norm6 shown in Mathematical Formula 7 where ci_off(c), ci_off_full, and ci_off_no are substituted for x, x0, and x1, respectively.

[Mathematical Formula 7]

$$norm6(x) = \begin{cases} c0 & \text{for } x < x0 \\ c1 & \text{for } 1x < x \\ c0 + (c1-c) \cdot f\left(\dfrac{x-x0}{x1-x0}\right) & \text{for } x0 \leq x \leq x1 \end{cases} \quad (7)$$

Here, a function f is, for example, an identity function. The function f may be a nonlinear increasing function that converts a value of 0 or more and 1 or less into a value of 0 or more and 1 or less. In this manner, a contrast can be changed. Consequently, the accuracy of the calculation of touch levels can be improved in some cases.

For example, c0 may be 0, and c1 may be 1.

Note that ci_off_no and ci_off_full can be modified as parameters, as appropriate. As a result, the accuracy of the calculation of touch levels can be improved in some cases.

Step S3B-1C corresponds to Step S3C-1C shown in FIG. 18. The processing in Step S3B-1C is an example of a calculation method for calculating touch levels when the display image is entirely black under the brightest ambient light. When the display image is entirely black under the brightest ambient light, ci_off(c) may represent a touch level. The accuracy of the calculation of touch levels can be improved by normalizing ci_off(c) in the above-described manner.

In Steps S3B-3, S3B-4, and S3B-5, processings that are the same as those in Steps S3C-3 and S3C-4 in FIG. 18 and Step S3-5 in FIG. 5 are performed. Thus, description of the flow charts in FIG. 5 and FIG. 18 can be referred to.

In the above-described manner, the images including touch levels are calculated.

In Step S3 described above, calculation is performed in consideration of the image that is being displayed and the illumination under actual ambient light, with the use of two kinds of sensor images, that is, a sensor image at the time when the light unit is lighting and a sensor image at the time when the light unit is not lighting. Consequently, the image containing a touch level that is less affected by ambient light and the display image can be calculated.

Figure 7:
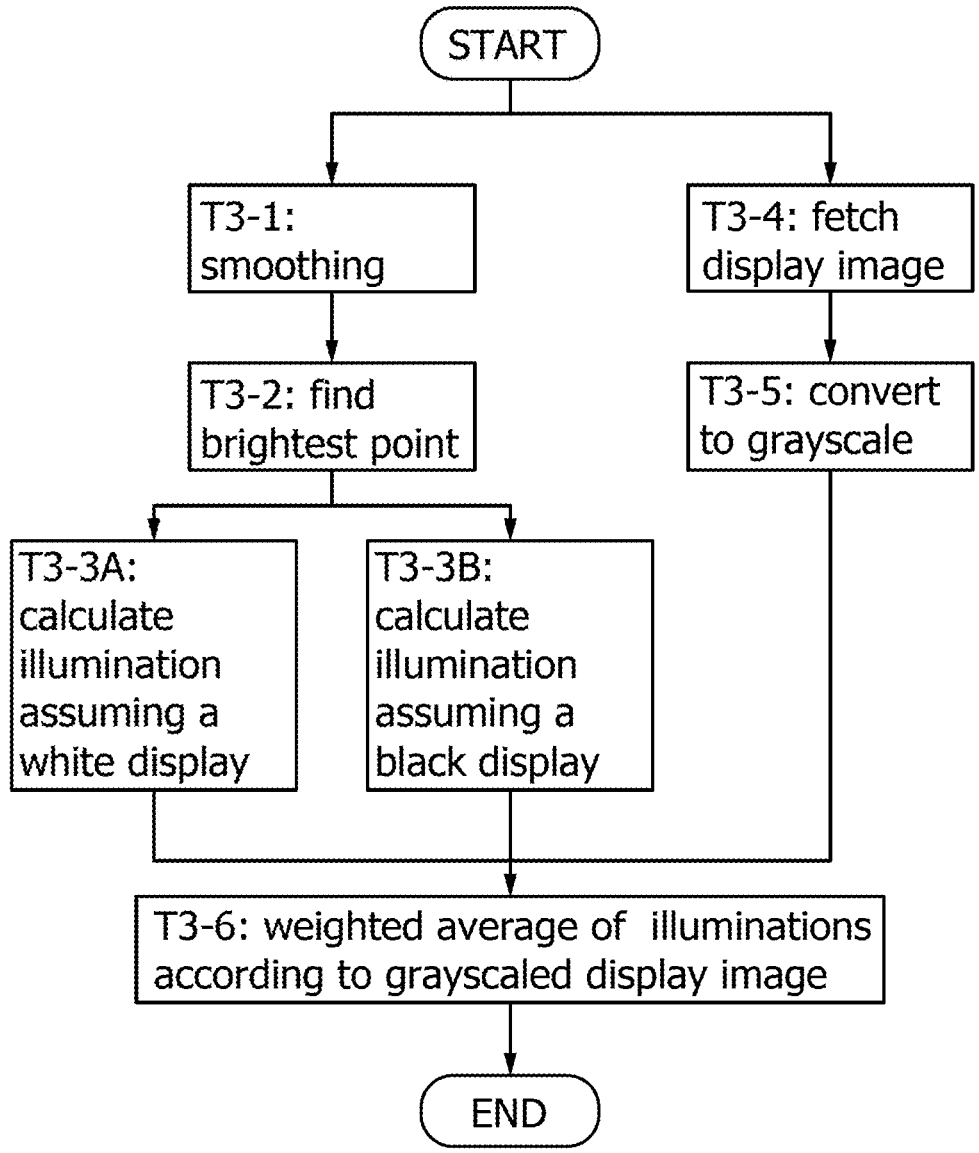
FIG. 7 is a flow chart of a program of one embodiment of the present invention.

FIG. 7 is an example of a flow chart for explaining Step T3 (calculation of an illumination). The flow chart in FIG. 7 includes Steps T3-1, T3-2, T3-3A, T3-3B, T3-4, T3-5, and T3-6.

At the start of Step T3, a sensor image from which a sensor image serving as a background is subtracted is produced.

In Step T3-1, a sensor image at the time when the light unit is not lighting is smoothed.

The smoothing is, for example, a processing of averaging the sensor input values of adjacent cells. For example, in a cell array having m rows and n columns, a sensor image has m×n sensor input values. For example, the smoothing is a processing of averaging the sensor input values of four cells located at (x0, y0), (x0+1, y0), (x0, y0+1), and (x0+1, y0+1) (x0 is an odd number of 1 to n inclusive, and y0 is an odd number of 1 to m inclusive). Here, (x, y) indicates the coordinates of a cell of the x-th column and y-th row. As a result, the smoothed sensor image has m×n/4 average sensor input values. The number of cells to be averaged is four in this example, but the number is not limited to four. For example, 16 cells may be averaged. By the smoothing, influences of dot defects or noise can be reduced.

In Step T3-2, the brightest point is found with the use of the smoothed sensor image. The sensor input value is a value reflecting the illumination under ambient light in some cases.

In Step T3-3A, an illumination illum_w is calculated with the sensor input value of the brightest point. The illumination illum_w is calculated by using a table or a function of the relation between ambient light and a sensor input value when the display image is entirely white. The illumination illum_w indicates an illumination under estimated ambient light when the obtained sensor image is white display. The function or the table is prepared based on data obtained by measurement in advance.

In Step T3-3B, an illumination illum_b is calculated with the sensor input value of the brightest point. The illumination illum_b is calculated by using a table or a function of the relation between ambient light and a sensor input value when the display image is entirely black. The illumination illum_b indicates an illumination under estimated ambient light when the obtained sensor image is black display. The function or the table is prepared based on data obtained by measurement in advance.

In Step T3-4, a display image is obtained.

In Step T3-5, the obtained display image is converted into a gray scale. A processing similar to that in Step S3-4 in the flow chart shown in FIG. 5 is performed, and description of the flow chart in FIG. 5 can be referred to.

In Step T3-6, in accordance with the display image that is converted into a grayscale, a weighted average of the illumination illum_w calculated in Step T3-3A and the illumination illumb calculated in Step T3-3B is obtained. As a result, the estimated illumination illum under actual ambient light is calculated.

A value gdor obtained by conversion into a grayscale at the brightest point found in Step T3-2 may be the value obtained by converting the display output value of one pixel the nearest to the point into a grayscale or the average of the values obtained by converting the display output values of a plurality of pixels including the point into grayscales. It is supposed that gdor is gdo_b when the display image is entirely black, and gdor is gdo_w when the display image is entirely white.

An example of a function for a weighted average will be described. A function mix3(illum_w, illum_b; gdor) for a weighted average returns a value between illum_w and illum_b in accordance with gdor. For example, the function mix3 is an increasing function or a decreasing function of gdor, and returns illum_w when the gdor is equal to gdo_w and returns illum_b when gdor is equal to gdo_b.

Another specific example of a function for a weighted average is shown. The function for a weighted average can be a function mix shown in Mathematical Formula 4 where illum_b, illum_w, gdor, gdo_b, and gdo_w are substituted for y0, y1, x, x0, and x1, respectively.

Here, a function f is, for example, an identity function. The function f may be a nonlinear increasing function that converts a value of 0 or more and 1 or less into a value of 0 or more and 1 or less.

In the above-described manner, the estimated illumination illum under ambient light is calculated.

The processing in Step T3 described above is performed, whereby the estimated illumination illum under ambient light can be calculated without an illumination sensor. The estimated illumination on a touch panel can be calculated.

Figure 8:
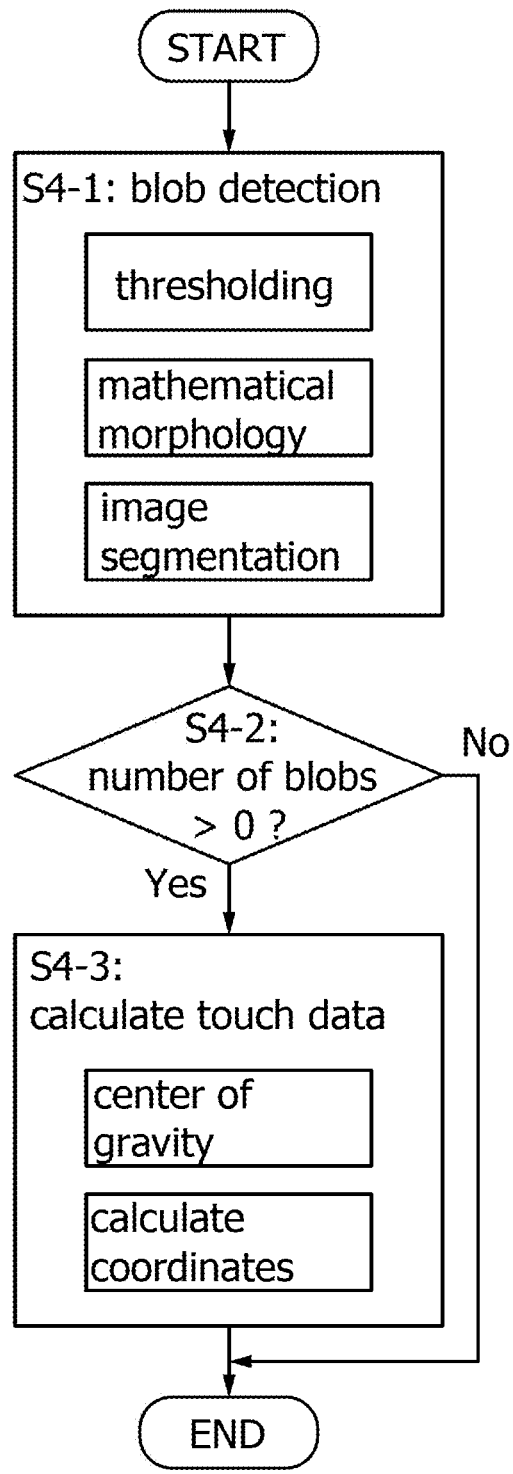
FIG. 8 is a flow chart of a program of one embodiment of the present invention.

FIG. 8 is an example of a flowchart for explaining Step S4 (calculation of touch data). The flow chart in FIG. 8 includes Steps S4-1, S4-2, and S4-3.

At the start of Step S4, an image containing a touch level is produced.

In Step S4-1, blob detection is performed. Examples of a method used for the blob detection include but are not limited to a method using thresholding or mathematical morphology, and image segmentation. Another example is contour detection.

In Step S4-2, whether at least one blob is detected is determined. When at least one blob is detected, the processing proceeds to Step S4-3. When no blob is detected, the processing is terminated.

In Step S4-3, touch data such as a touch position is calculated. For example, a center of gravity or the coordinates of a touch position is calculated.

In the above-described manner, the program of one embodiment of the present invention enables calculation of touch data such as a touch position. Two sensor images, one obtained at the time when the light unit is lighting and the other obtained at the time when the light unit is not lighting, are used and calculation is performed in consideration of an image that is being displayed and the illumination illum under ambient light; thus, touch data can be calculated more stably and with higher accuracy. With the program in a storage portion, a more convenient data processing device can be provided.

Note that the frequency of calculation of an estimated illumination and the frequency of calculation of touch data such as a touch position can be either equal to or different from each other. Because the illumination under ambient light is not changed so often, the frequency of calculation of an estimated illumination may be lower than the frequency of calculation of touch data. For example, the frequency of calculation of an estimated illumination can be 1/60 to 1 time as high as the frequency of calculation of touch data. For example, the frequency of calculation of touch data can be 1/10 to 1 time as high as the frequency of updating of display images.

Note that this embodiment can be combined with any of the other embodiments in this specification as appropriate.

Embodiment 2

In this embodiment, an information processing device of one embodiment of the present invention will be described with reference to drawings.

A structural example of the information processing device of one embodiment of the present invention will be described with reference to FIG. 9.

Figure 9:
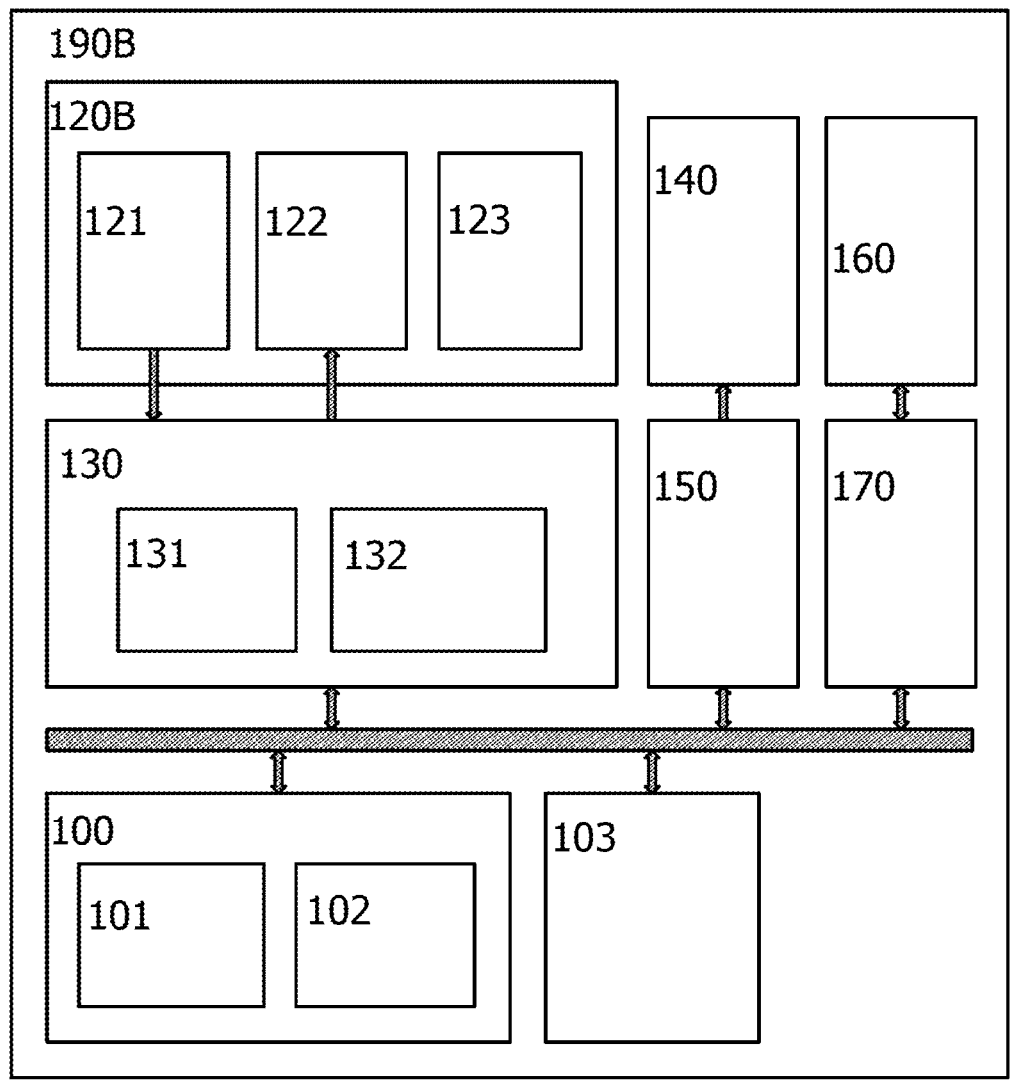
FIG. 9 is a block diagram of an information processing device of one embodiment of the present invention.

FIG. 9 is a block diagram illustrating the structure of an information processing device 190B.

The information processing device 190B illustrated in FIG. 9 includes a processor 100, a memory 103, a display and photo sensor unit 120B, a sensor unit 140, a communication unit 160, a controller 130, a controller 150, and a controller 170. The processor 100 includes the execution unit 101 and the memory 102. The display and photo sensor unit 120B includes the photo sensor unit 121, the display 122, and the light unit 123. The controller 130 includes a memory 131 and a memory 132. The processor 100, the memory 103, the controller 130, the controller 150, and the controller 170 are connected through a bus.

The processor 100 executes various programs such as a program that processes sensor images. The memory 102 stores a program of one embodiment of the present invention that processes sensor images. The execution unit 101 executes the above program. The memory 103 stores a display image or the like. The memory 103 has larger storage capacity than the memory 102.

The display and photo sensor unit 120B is capable of displaying an image in the display 122 and inputting touch data such as a touch position in the photo sensor unit 121. The photo sensor unit 121 may have a function as a touch panel.

The controller 130 controls the photo sensor unit 121, the display 122, and the light unit 123. The memory 131 may store a sensor image output from the photo sensor unit. The memory 132 may store a display image to be output to the display 122.

For the sensor unit 140, a temperature sensor, an illumination sensor, or the like may be provided. The controller 150 controls the sensor unit 140. For example, a temperature is obtained from a temperature sensor, or an illumination is obtained from an illumination sensor. The processor 100 can perform a processing in accordance with the obtained temperature or illumination. For example, an operating voltage may be decreased when the obtained temperature is high, or the luminance of the light unit may be increased when the obtained illumination is high. In Program P1 of one embodiment of the present invention, an illumination may be obtained from an illumination sensor in the sensor unit 140.

The communication unit 160 is, for example, a unit that performs wireless communication. The controller 170 controls the communication unit 160.

The information processing device 190B is, for example, provided with an optical touch panel and capable of wireless communication, and can calculate touch data such as a touch position with the use of a program stored in the memory 102.

Note that this embodiment can be combined with any of the other embodiments in this specification as appropriate.

Embodiment 3

In this embodiment, an information processing device of one embodiment of the present invention will be described with reference to drawings.

Examples of the information processing device of one embodiment of the present invention include television devices (also referred to as televisions or television receivers), computers, digital video cameras, digital photo frames, mobile phones (also referred to as cellular phones or mobile phone devices), portable game machines, portable information terminals, and game machines. Specific examples of these electronic devices are given below.

FIG. 10A illustrates an example of a television set. In the television set, a display unit 413 is incorporated in a housing 411. In addition, here, the housing 411 is supported on a wall with a fixing member 415. Images can be displayed on the display unit 413. Furthermore, a photo sensor unit is provided in a region overlapping with the display unit 413.

The television set is provided with a processor and a memory and capable of calculating touch data such as a touch position using the program of one embodiment of the present invention that is stored in the memory. Thus, touch data can be stably calculated under any of the conditions of various display images and the illuminations of various kinds of ambient light. This allows stable control of a channel, a volume, or images.

The television set can be operated by operation switches incorporated in the housing 411 or a separate remote controller 401. The television set can be operated with operation keys 403 of the remote controller 401. Furthermore, the remote controller 401 may be provided with a display portion 402.

FIG. 10B1 illustrates a computer including a main body 421, a housing 422, a display unit 423, a keyboard 424, an external connection port 425, a pointing device 426, and the like. Note that a photo sensor unit is provided in a region overlapping with the display unit 423 in this computer.

A computer may have a structure illustrated in FIG. 10B2. A computer illustrated in FIG. 10B2 is provided with a display unit 430 instead of the keyboard 424 and the pointing device 426.

A photo sensor unit is provided in a region overlapping with the display units 423 and 430. That is, the display unit 423 and the display unit 430 each have an optical touch panel, and input can be performed by operation of images, which are displayed on the display unit 423 and the display unit 430, with a finger or a pen. The display unit 423 and the display unit 430 can also display images other than the images for input. Note that one of the display unit 423 and the display unit 430 may be an optical touch panel.

The computer is provided with a processor and a memory and capable of calculating touch data such as a touch position using the program of one embodiment of the present invention that is stored in the memory. Thus, touch data can be stably calculated under any of the conditions of various display images and the illuminations of various kinds of ambient light. This allows stable control of the computer.

FIG. 10C illustrates a portable game machine including two housings, a housing 431 and a housing 432. The housings 431 and 432 are connected with a connection portion 433 so as to be opened and closed. A display unit 434 is incorporated in the housing 431. A display unit 435 is incorporated in the housing 432.

A photo sensor unit is provided in a region overlapping with the display units 434 and 435, whereby an optical touch panel is formed. The portable game machine is provided with a processor and a memory and capable of calculating touch data such as a touch position using the program of one embodiment of the present invention that is stored in the memory. Thus, touch data can be stably calculated under any of the conditions of various display images and the illuminations of various kinds of ambient light. This allows stable control of the portable game machine.

In addition, the portable game machine illustrated in FIG. 10C includes a speaker portion 436, a recording medium insertion portion 437, an LED lamp 438, an input means (an operation key 439, a connection terminal 440, a sensor 441 (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays), and a microphone 442), and the like. The portable game machine illustrated in FIG. 10C has a function of reading out a program or data stored in a storage medium to display it on the display unit, and a function of sharing information with another portable game machine by wireless communication. The functions of the portable game machine in FIG. 10C are not limited to the above, and the portable game machine can have a variety of functions.

FIG. 10D illustrates an example of a mobile phone. The mobile phone includes an operation button 453, an external connection port 454, a speaker 455, a microphone 456, and the like in addition to a display unit 452 incorporated in a housing 451.

In the mobile phone illustrated in FIG. 10D, a photo sensor unit is provided in a region overlapping with the display unit 452, and thus, the mobile phone has an optical touch panel. When the display unit 452 is touched with a finger or the like, data can be input into the mobile phone. In this case, operations such as making a call and creating an e-mail can be performed by touch on the display unit 452 with a finger or the like.

The mobile phone is provided with a processor and a memory and capable of calculating touch data such as a touch position using the program of one embodiment of the present invention that is stored in the memory. Thus, touch data can be stably calculated under any of the conditions of various display images and the illuminations of various kinds of ambient light. This allows stable control of the mobile phone.

A signal is sensed with the photo sensor unit provided in the region overlapping with the display unit 452. A screen mode may be controlled to be switched when touch input to the display unit 452 is not performed for a certain period.

The display unit 452 may function as an image sensor. For example, an image of a palm print, a fingerprint, or the like is taken when the display unit 452 is touched with the palm or the finger, whereby personal authentication can be performed. Furthermore, by providing a backlight or a sensing light source that emits a near-infrared light in the display unit, an image of a finger vein, a palm vein, or the like can be taken.

Note that this embodiment can be combined with any of the other embodiments in this specification as appropriate.

Note that the term "semiconductor device" in this specification indicates all the devices that can operate by utilizing semiconductor characteristics. A circuit including a semiconductor element (e.g., a transistor or a diode) and a device including the circuit, and the like are included in the category of a semiconductor device. For example, an electronic circuit and a chip including an electronic circuit are all semiconductor devices. A memory device, a display device, a light-emitting device, a lighting device, an electro-optical device, an electronic device, and the like include a semiconductor device in some cases.

A transistor includes three nodes (terminals) called a gate, a source, and a drain. A gate is a node that controls the conduction state of a transistor. Depending on the channel type of the transistor or the levels of potentials supplied to the nodes (terminals), one of nodes (an input node and an output node) functions as a source and the other functions as a drain. In general, in an n-channel transistor, a node to which a low potential is supplied is referred to as a source, and a node to which a high potential is supplied is referred to as a drain. In contrast, in a p-channel transistor, a node to which a low potential is supplied is referred to as a drain, and a node to which a high potential is supplied is referred to as a source.

In this specification, to clarify a circuit configuration and circuit operations, one of two nodes (an input node and an output node) of a transistor is fixed as a source and the other is fixed as a drain in some cases. It is needless to say that, depending on a driving method, the magnitude relation between potentials supplied to three terminals of the transistor might be changed, and the source and the drain might be interchanged. Thus, in one embodiment of the present invention, the distinction between the source and drain of the transistor is not limited to that described in this specification and the drawings.

A conductor functioning as a gate of the transistor is referred to as a gate electrode. A conductor functioning as a source of the transistor is referred to as a source electrode. A conductor functioning as a drain of the transistor is referred to as a drain electrode. A region functioning as a source of the transistor is referred to as a source region. A region functioning as a drain of the transistor is referred to as a drain region. In this specification, a gate electrode is referred to as a gate, a drain electrode or a drain region is referred to as a drain, and a source electrode or a source region is referred to as a source in some cases.

Note that a voltage refers to a potential difference between a certain potential and a reference potential (e.g., a ground potential (GND) or a source potential) in many cases. A voltage can be referred to as a potential and vice versa.

Note that the layout of circuit blocks in drawings specifies the positional relation for description. Thus, even when a drawing shows that different functions are achieved in different circuit blocks, an actual circuit or region may be configured so that the different functions are achieved in the same circuit block. Furthermore, the function of each circuit block in a drawing is specified for description. Thus, even when one circuit block is illustrated, an actual circuit or region may be configured so that processing illustrated as being performed in the one circuit block is performed in a plurality of circuit blocks.

Note that the term "connection" in this specification means electrical connection and corresponds to the case of a circuit configuration in which a current, a voltage, or a potential can be supplied or transmitted. Accordingly, a circuit configuration in which elements (e.g., a switch, a transistor, a capacitor, an inductor, a resistor, a diode, a display element, a light-emitting element, and a load) are connected means not only a circuit configuration in which such elements are directly connected but also a circuit configuration in which such elements are connected through an element such as a wiring, a resistor, a diode, or a transistor so that a current, a voltage, or a potential can be supplied or transmitted.

In this specification, even when different components are connected to each other in a circuit diagram, there is actually a case where one conductor has functions of a plurality of components, such as a case where part of a wiring serves as an electrode. The term "connection" in this specification also means such a case where one conductor has functions of a plurality of components.

Note that what is described (or part thereof) in one embodiment can be applied to, combined with, or replaced with different contents in the embodiment and/or what is described (or part thereof) in another embodiment or other embodiments.

Note that in each embodiment, what is described in the embodiment is contents described with reference to a variety of diagrams or contents described with text described in this specification.

Note that by combining a diagram (or may be part of the diagram) illustrated in one embodiment with another part of the diagram, a different diagram (or may be part of the different diagram) illustrated in the embodiment, and/or a diagram (or may be part of the diagram) illustrated in another embodiment or other embodiments, much more diagrams can be formed.

Note that contents that are not specified in any drawing or text in the specification can be excluded from one embodiment of the invention. Alternatively, when the range of a value that is defined by the maximum and minimum values is described, part of the range is appropriately narrowed or part of the range is removed, whereby one embodiment of the invention excluding part of the range can be constituted. In this manner, it is possible to specify the technical scope of one embodiment of the present invention so that a conventional technology is excluded, for example.

As a specific example, a diagram of a circuit including first to fifth transistors is illustrated. In that case, it can be specified that the circuit does not include a sixth transistor in the invention. It can be specified that the circuit does not include a capacitor in the invention. It can be specified that the circuit does not include a sixth transistor with a particular connection structure in the invention. It can be specified that the circuit does not include a capacitor with a particular connection structure in the invention. For example, it can be specified that a sixth transistor whose gate is connected to a gate of the third transistor is not included in the invention. For example, it can be specified that a capacitor whose first electrode is connected to the gate of the third transistor is not included in the invention.

Note that in this specification and the like, it may be possible for those skilled in the art to constitute one embodiment of the invention even when portions to which all the terminals of an active element (e.g., a transistor or a diode), a passive element (e.g., a capacitor or a resistor), and the like are connected are not specified. In other words, one embodiment of the invention is clear even when connection portions are not specified. Further, in the case where a connection portion is disclosed in this specification and the like, it can be determined that one embodiment of the invention in which a connection portion is not specified is disclosed in this specification and the like, in some cases. In particular, in the case where the number of portions to which the terminal is connected may be more than one, it is not necessary to specify the portions to which the terminal is connected. Therefore, it may be possible to constitute one embodiment of the invention by specifying only portions to which some of terminals of an active element (e.g., a transistor or a diode), a passive element (e.g., a capacitor or a resistor), and the like are connected.

Note that in this specification and the like, it may be possible for those skilled in the art to specify the invention when at least the connection portion of a circuit is specified. Alternatively, it may be possible for those skilled in the art to specify the invention when at least a function of a circuit is specified. In other words, when a function of a circuit is specified, one embodiment of the present invention is clear. Moreover, it can be determined that one embodiment of the present invention whose function is specified is disclosed in this specification and the like. Therefore, when a connection portion of a circuit is specified, the circuit is disclosed as one embodiment of the invention even when a function is not specified, and one embodiment of the invention can be constituted. Alternatively, when a function of a circuit is specified, the circuit is disclosed as one embodiment of the invention even when a connection portion is not specified, and one embodiment of the invention can be constituted.

Note that in this specification and the like, part of a diagram or text described in one embodiment can be taken out to constitute one embodiment of the invention. Thus, in the case where a diagram or text related to a certain portion is described, the contents taken out from part of the diagram or the text are also disclosed as one embodiment of the invention, and one embodiment of the invention can be constituted. The embodiment of the present invention is clear. Therefore, for example, in a diagram or text in which one or more active elements (e.g., transistors or diodes), wirings, passive elements (e.g., capacitors or resistors), conductive layers, insulating layers, semiconductor layers, organic materials, inorganic materials, components, devices, operating methods, manufacturing methods, or the like are described, part of the diagram or the text is taken out, and one embodiment of the invention can be constituted. For example, from a circuit diagram in which N circuit elements (e.g., transistors or capacitors; N is an integer) are provided, it is possible to take out M circuit elements (e.g., transistors or capacitors; M is an integer, where M<N) and constitute one embodiment of the invention. For another example, it is possible to take out M layers (M is an integer, where M<N) from a cross-sectional view in which N layers (N is an integer) are provided and constitute one embodiment of the invention. For another example, it is possible to take out M elements (M is an integer, where M<N) from a flow chart in which N elements (N is an integer) are provided and constitute one embodiment of the invention. For another example, it is possible to take out some given elements from a sentence "A includes B, C, D, E, or F" and constitute one embodiment of the invention, for example, "A includes B and E", "A includes E and F", "A includes C, E, and F", or "A includes B, C, D, and E".

Note that in the case where at least one specific example is described in a diagram or text described in one embodiment in this specification and the like, it will be readily appreciated by those skilled in the art that a broader concept of the specific example can be derived. Therefore, in the diagram or the text described in one embodiment, in the case where at least one specific example is described, a broader concept of the specific example is disclosed as one embodiment of the invention, and one embodiment of the invention can be constituted. The embodiment of the present invention is clear.

Note that in this specification and the like, what is illustrated in at least a diagram (which may be part of the diagram) is disclosed as one embodiment of the invention, and one embodiment of the invention can be constituted. Therefore, when certain contents are described in a diagram, the contents are disclosed as one embodiment of the invention even when the contents are not described with text, and one embodiment of the invention can be constituted. In a similar manner, part of a diagram, which is taken out from the diagram, is disclosed as one embodiment of the invention, and one embodiment of the invention can be constituted. The embodiment of the present invention is clear.

Example 1

In this example, the program and the information processing device of one embodiment of the present invention will be described with reference to drawings.

Figure 14:
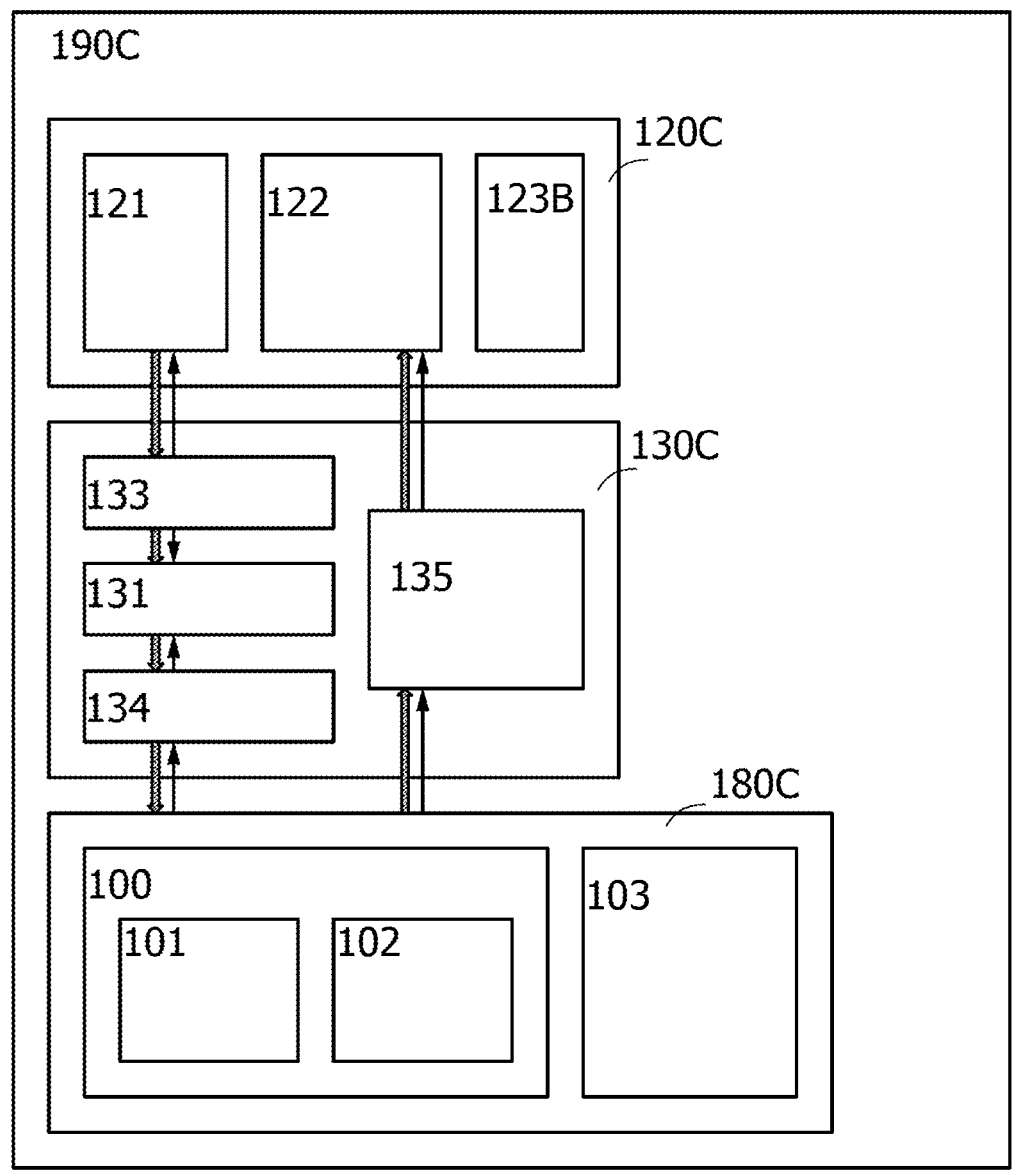
FIG. 14 is a block diagram of an information processing device of one embodiment of the present invention.

A touch position was calculated using an information processing device 190C illustrated in FIG. 14.

The information processing device 190C in FIG. 14 includes a board 130C, a computer 180C, and a module 120C including a display and a photo sensor unit. The module 120C includes the photo sensor unit 121, the display 122, and a backlight 123B. The board 130C includes the memory 131, a controller 133, a controller 134, and a controller 135. The computer 180C includes the processor 100 and the memory 103. The processor 100 includes the execution unit 101 and the memory 102.

The controller 133 fetches a sensor image from the photo sensor unit 121 and stores the fetched sensor image in the memory 131. The controller 134 reads out the sensor image stored in the memory 131 and supplies it to the computer 180C. The controller 135 fetches a display image from the computer 180C and supplies the fetched display image to the display 122. The program of one embodiment of the present invention that processes a sensor image is stored in the memory 102. The execution unit 101 executes the above program.

The structure of the module 120C including the display and the photo sensor unit will be described.

For evaluation, an in-cell touch panel using a transistor including an oxide semiconductor (preferably an oxide containing In, Ga, and Zn) in its channel formation region (hereinafter also referred to as an oxide semiconductor transistor in the following description) is used. In this panel, a cell including a photodiode is provided for every four sub-pixels. This panel is a 6-inch liquid crystal panel with a resolution of 768 (H)×1024 (V) that is capable of rewriting data at 60 frames per second (fps).

Figure 11:
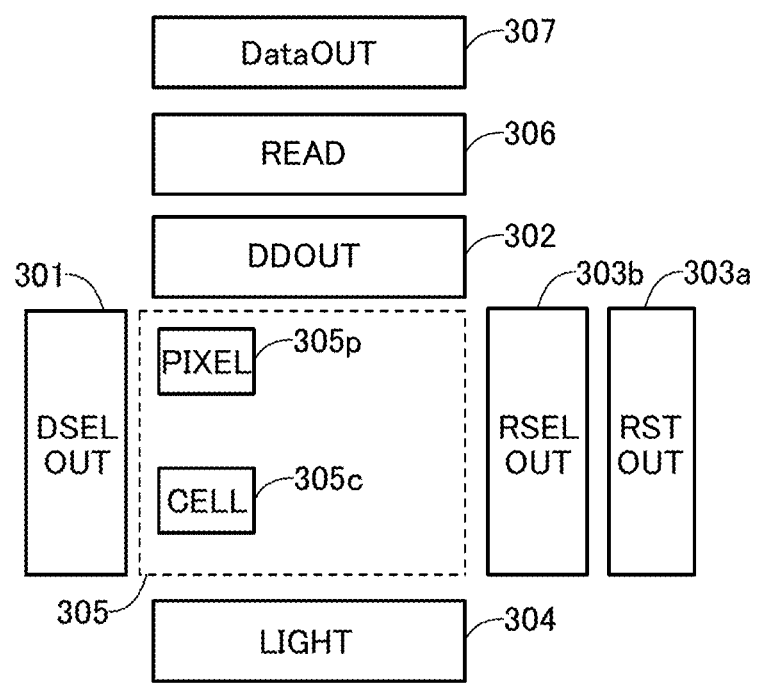
FIG. 11 is a block diagram of a module including a display unit and a photo sensor unit.

FIG. 11 is a block diagram illustrating a configuration example of the module 120C including the display and the photo sensor unit.

The module 120C illustrated in FIG. 11 includes a display selection signal output circuit (DSELOUT) 301, a display data signal output circuit (DDOUT) 302, a reset signal output circuit (RSTOUT) 303a, a read selection signal output circuit (RSELOUT) 303b, a light unit 304, a region 305 provided with 768×1024 pixels (PIXEL) 305p and 384×512 cells (CELL) 305c, a read circuit 306, and a data output circuit 307.

The display selection signal output circuit 301, the display data signal output circuit 302, and the pixel 305p may be included in the display 122. The reset signal output circuit 303a, the read selection signal output circuit 303b, and the cell 305c may be included in the photo sensor unit 121. The display 122 and the photo sensor unit 121 are provided so as to overlap with each other. The light unit 304 corresponds to the backlight 123B.

The display selection signal output circuit 301 has a function of outputting a plurality of display selection signals. An image signal is input to the display data signal output circuit 302. The display data signal output circuit 302 has functions of generating a display data signal based on the input image signal and outputting the generated display data signal. The reset signal output circuit 303a has a function of outputting a reset signal. The read selection signal output circuit 303b has a function of outputting a read selection signal. The light unit 304 includes a white LED as a light source and has a function of lighting when the light source emits light.

The pixel 305p includes, for example, a selection transistor and a liquid crystal element. The liquid crystal element is an element whose light transmittance is changed by voltage application. The selection transistor is turned on or off in accordance with the display selection signal. The liquid crystal element is set in a display state depending on the display data signal.

The cell 305c has a function of generating a voltage in accordance with the illumination of incident light. A reset signal and a read selection signal are input to the cell 305c. The cell 305c is set to be in a reset state in accordance with the reset signal. In addition, the cell 305c has a function of outputting a data signal in accordance with the read selection signal.

The read circuit 306 has functions of selecting the cell 305c and reading the data signal from the selected cell 305c. The read circuit 306 has a function of supplying the read data signal to the data output circuit 307. The data output circuit 307 has a function of outputting the input data signal to the outside.

A driving method of the display and photo sensor module 120C illustrated in FIG. 11 is divided into a sensor input operation and a display operation.

In the sensor input operation, for example, when the light unit 304 is turned on or off, the cell 305c outputs a data signal, the read circuit 306 reads out the data signal, and the data output circuit 307 outputs the read data signal. Alternatively, as in the program of one embodiment of the present invention, a data signal may be output from the cell 305c at each of the time when the light unit 304 is turned on and the time when the light unit 304 is turned off.

In the display operation, for example, when the light unit 304 is turned on, the selection transistor is turned on in accordance with the display selection signal. At this time, voltage depending on the display data signal is applied to the liquid crystal element, so that the liquid crystal element is set to be in a display state depending on the applied voltage. After that, the selection transistor is turned off in accordance with the display selection signal.

Figure 12:
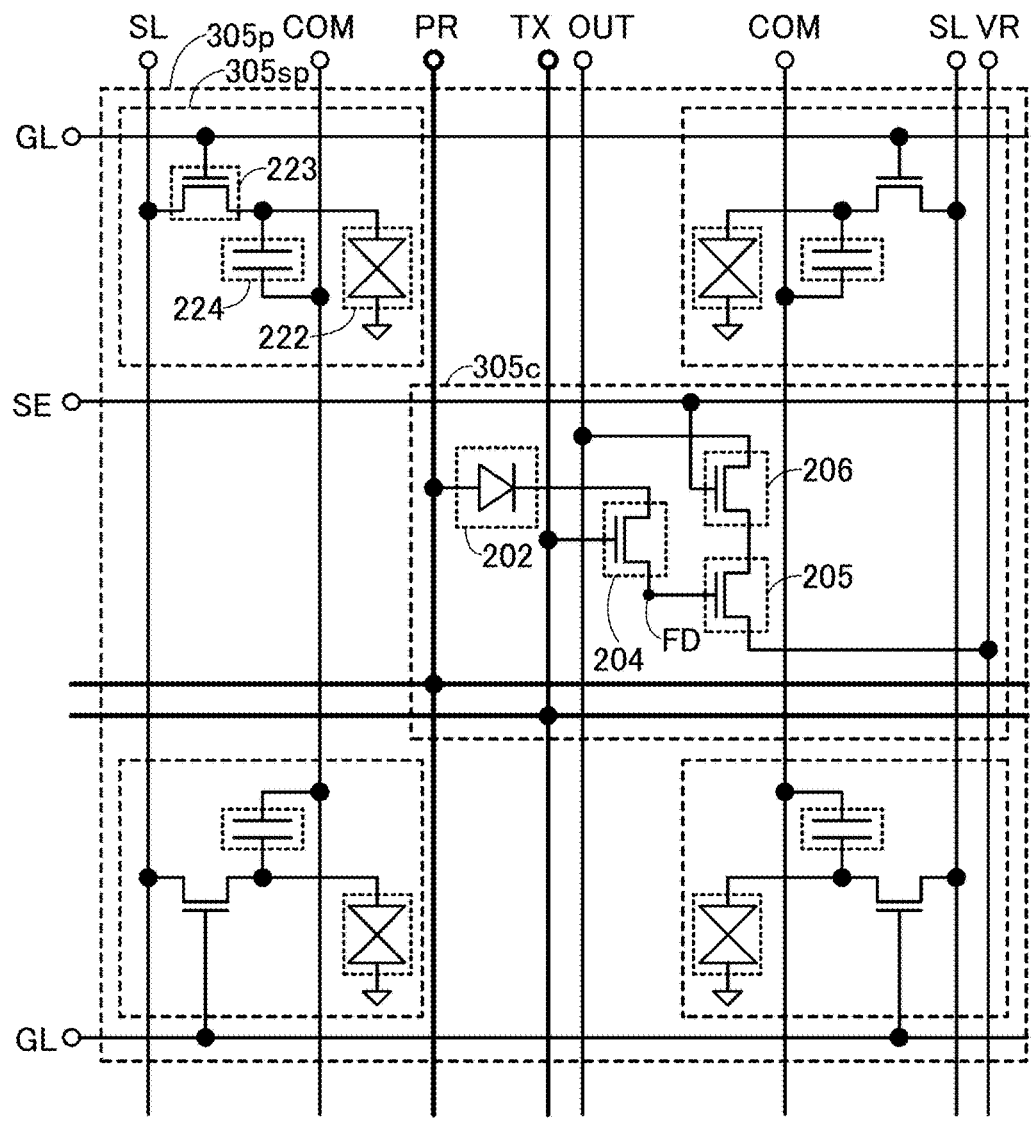
FIG. 12 is a circuit diagram illustrating a cell including a pixel and a photodiode.

FIG. 12 illustrates an example of the circuit configuration of the pixel 305p and the cell 305c. In FIG. 12, four sub-pixels 305sp and one cell 305c are illustrated.

The sub-pixel 305sp includes a liquid crystal element 222, a selection transistor 223, and a capacitor 224. A gate of the selection transistor 223 is connected to the scan line GL, one of a source and a drain thereof is connected to a signal line SL, and the other of the source and the drain thereof is connected to the liquid crystal element 222. One of a pair of electrodes included in the capacitor 224 is connected to the liquid crystal element 222, and the other is connected to a wiring COM.

The display selection signal is input to the scan line GL. The display data signal is input to the signal line SL.

The cell 305c includes a photodiode 202, a transistor 204, a transistor 205, and a transistor 206. The photodiode 202 is a photoelectric conversion element that generates a current when a junction of semiconductors is irradiated with light. An anode of the photodiode 202 is electrically connected to a wiring PR. A cathode of the photodiode 202 is connected to one of a source and a drain of the transistor 204. The other of the source and the drain of the transistor 204 is connected to a gate of the transistor 205. A gate of the transistor 204 is connected to a wiring TX. One of a source and a drain of the transistor 205 is connected to a wiring VR to which a high-level power supply potential VDD is supplied. The other of the source and the drain of the transistor 205 is connected to one of a source and a drain of the transistor 206. The other of the source and the drain of the transistor 206 is connected to a wiring OUT. A gate of the transistor 206 is connected to a wiring SE. The wiring SE is supplied with the potential of a signal for controlling switching of the transistor 206.

The reset signal is input to the wiring PR. The read selection signal is input to the wiring SE.

The potential of a signal to be output to a wiring OUT depends on the amount of charge stored in a node FD connected to the gate of the transistor 205. To more reliably store charge in the node FD, the transistor 204 preferably has a low off-state current. In this example, the use of an oxide semiconductor transistor as the transistor 204 enables a low off-state current.

Figure 13:
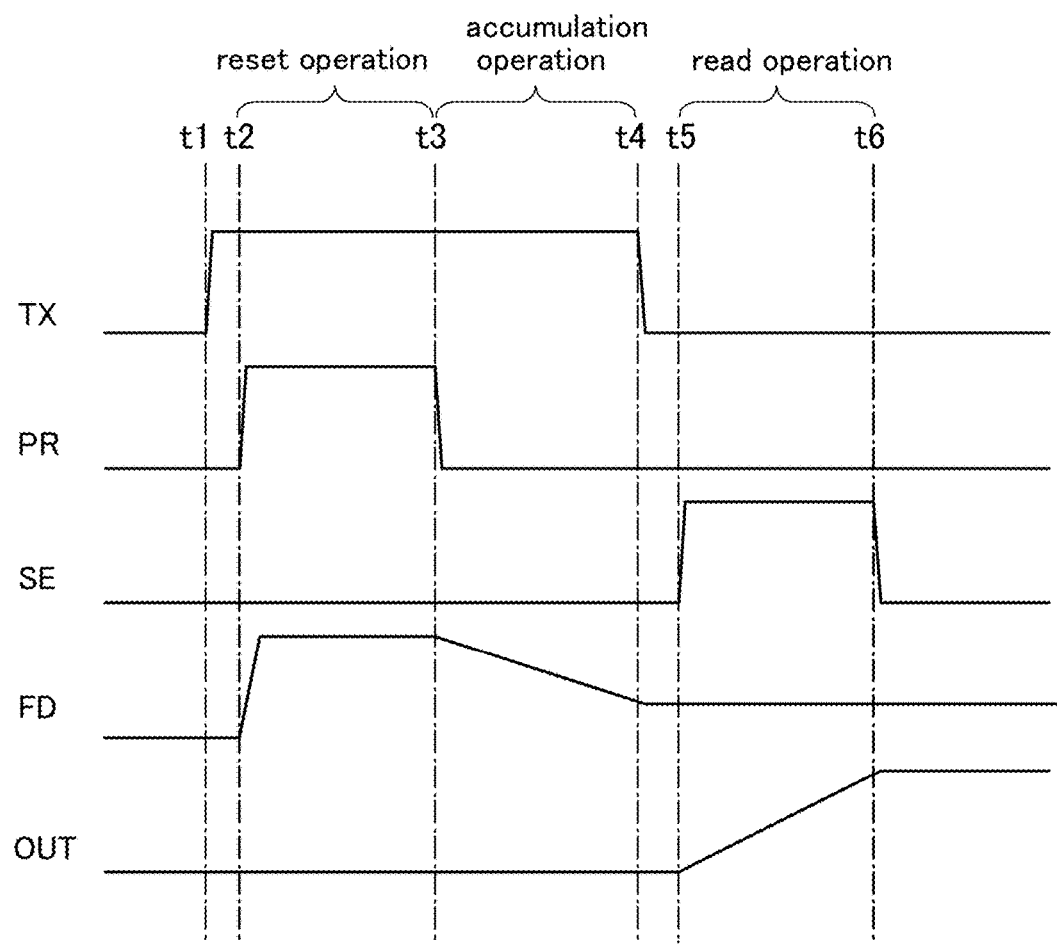
FIG. 13 is a timing chart showing the operation of a cell including a photodiode.

The operations of the cell 305c will be described. FIG. 13 shows an example of a timing chart of various potentials supplied to the cell 305c.

In the timing chart in FIG. 13, it is assumed that the wiring TX is supplied with a high-level potential HTX and a low-level potential LTX; the wiring SE, a high-level potential HSE and a low-level potential LSE; and the wiring PR, a high-level potential HPR and a low-level potential LPR.

First, at a time t1, the potential of the wiring TX is changed from the potential LTX to the potential HTX. When the potential of the wiring TX changes to the potential HTX, the transistor 204 is turned on. Note that at the time t1, the wiring SE is supplied with the potential LSE, and the wiring PR is supplied with the potential LPR.

Next, at a time t2, the potential of the wiring PR is changed from the potential LPR to the potential HPR. At the time t2, the potential of the wiring TX remains the potential HTX, and the potential of the wiring SE remains the potential LSE. Accordingly, the node FD is supplied with the potential HPR of the wiring PR; thus, the amount of charge held in the node FD is reset.

Then, at a time t3, the potential of the wiring PR is changed from the potential HPR to the potential LPR. Until shortly before the time t3, the potential of the node FD remains the potential HPR. Thus, when the potential of the wiring PR changes to the potential LPR, a reverse bias voltage is applied to the photodiode 202. Then, when light enters the photodiode 202 in the state where a reverse bias voltage is applied to the photodiode 202, a current flows from a cathode of the photodiode 202 toward an anode thereof. As the intensity of light entering the photodiode 202 is higher, the value of the current is higher and the amount of charge leaking from the node FD is larger. Thus, as the intensity of light is higher, the amount of change in potential of the node FD increases.

Then, at a time t4, when the potential of the wiring TX is changed from the potential HTX to the potential LTX, the transistor 204 is turned off. Accordingly, the transfer of charge from the node FD to the photodiode 202 stops, and the potential of the node FD is determined.

Next, at a time t5, when the potential of the wiring SE is changed from the potential LSE to the potential HSE, the transistor 206 is turned on. Then, in accordance with the potential of the node FD, charge is transferred from the wiring VR to the wiring OUT.

Next, at a time t6, when the potential of the wiring SE is changed from the potential HSE to the potential LSE, the transfer of charge from the wiring VR to the wiring OUT stops and the potential of the wiring OUT is determined. This potential of the wiring OUT corresponds to the potential of the output signal of the cell 305c.

The above-described series of operations can be classified into a reset operation, an accumulation operation, and a read operation. In other words, an operation from the time t2 to the time t3 corresponds to the reset operation; an operation from the time t3 to the time t4, the accumulation operation; and an operation from the time t5 to the time t6, the read operation. A sensor input value can be obtained by performing the reset operation, the accumulation operation, and the read operation.

For evaluation, two sensor images were fetched for each frame. One is a sensor image when the light unit is on, and the other is a sensor image when the light unit is off. As is described below, according to the procedure of a program of one embodiment of the present invention (hereinafter referred to as algorithm), the two sensor images were sent to a host system and subjected to image processing for touch point detection.

Figure 19:
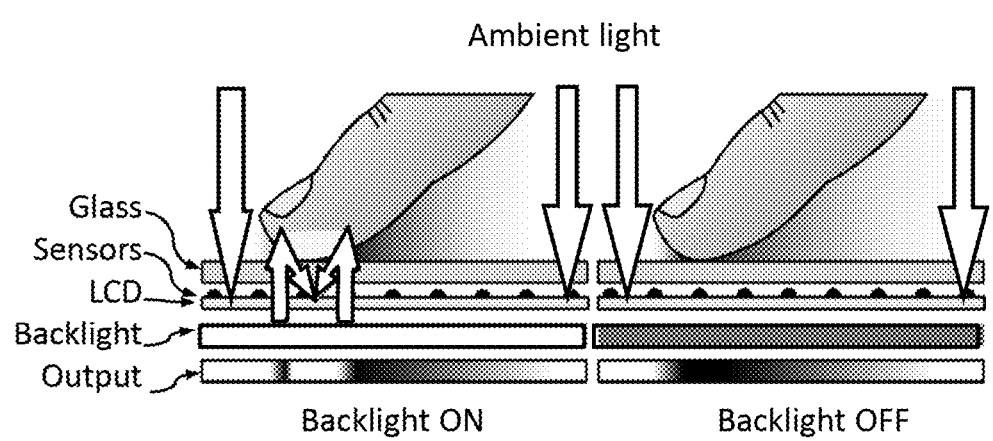
FIG. 19 is a schematic view of a module including a display unit and a photo sensor unit.

FIG. 19 is a schematic view of a module 120 including a display and photo sensor unit. The module 120 is capable of fetching two sensor images for each frame. One of the sensor images is fetched when the light unit is on, and the other is fetched when the light unit is off.

A method in which all cells perform accumulation operations at a time is called a global shutter system. A method in which accumulation operations in cells are sequentially performed on a row-by-row basis is called a rolling shutter system. For this evaluation, a global shutter system was employed. In a global shutter system, a period in which accumulation operations in all cells are completed is shorter than that in a rolling shutter system, so that sensor images can be fetched at high speed. Thus, a global shutter system is particularly efficient for this evaluation, in which two sensor images are fetched for each frame. Furthermore, in the case where an object that moves at high speed is taken, a sensor image of the object with large distortion is fetched by a rolling shutter system, whereas a sensor image of the object with small distortion can be fetched by a global shutter system.

In both the methods, a read operation is performed for cells in each row; thus, the timing when the read period starts varies depending on the row of the cells. Thus, in a global shutter method, the length of a period from when an accumulation period ends to when a read period starts (also referred to as a charge storing period) varies depending on the row of the cells. For this reason, if charge stored in the node FD in the cell leaks over time, the potentials of output signals of the cells vary depending on the row, so that image data whose grayscale level varies depending on the row might be obtained. In this example, an oxide semiconductor transistor with a low off-state current was used as the transistor 204 in the cell 305c shown in FIG. 12. As a result, even in a global shutter system, variations in grayscale level of image data due to a difference in the length of the charge storing period were able to be reduced, and a high-quality image was able to be taken.

Figure 15:
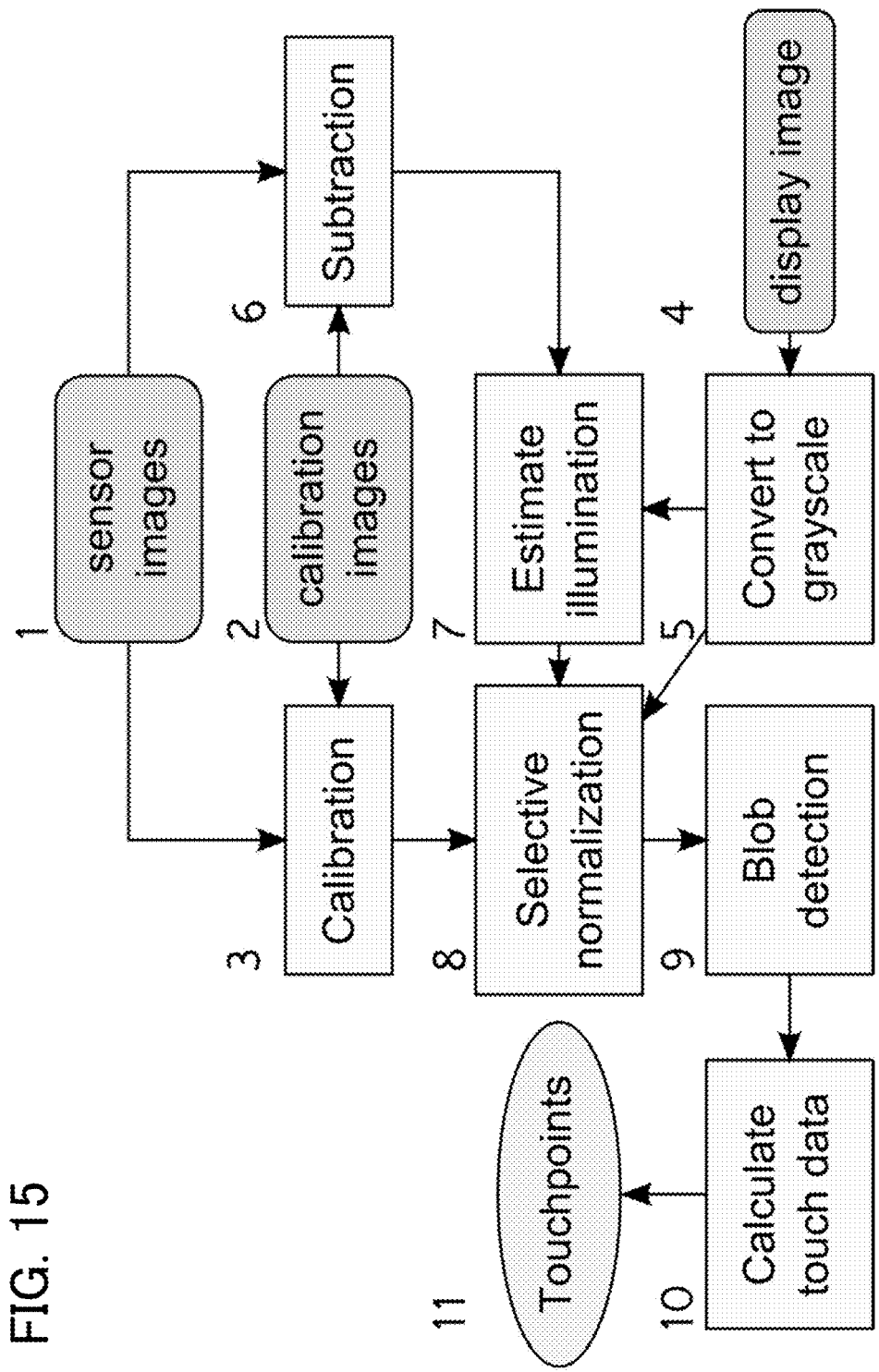
FIG. 15 is a flow chart of a program of one embodiment of the present invention.

FIG. 15 shows an overview of the algorithm used for the evaluation. In the algorithm, the illumination of ambient light and the output values of pixels on the panel are considered in detection and calculation of a touch point. In this example, the pixel output value is represented by a floating point number from 0 to 1. Note that 1 indicates white display, and 0 indicates black display.

Two calibration images taken in advance under the darkest ambient light and under the brightest ambient light when a white image is displayed (referred to as a darkest calibration image and a brightest calibration image below) are used to calibrate a sensor image in each cell (Block 3 in FIG. 15). The sensor input value of each cell is converted into a value that is in the range from 0 to 1 by obtaining a difference between the sensor image and the darkest calibration image and dividing the difference by a difference between the darkest calibration image and the brightest calibration image.

A third calibration image is fetched in advance under the darkest ambient light when a black image is displayed. To adjust an offset of the sensor image, a difference between a sensor image taken when the light unit is off and the third calibration image is calculated (Block 6 in FIG. 15). An image obtained by calculating the difference is used in estimating an illumination (Block 7 in FIG. 15). A display image is converted into a grayscale (Block 5 in FIG. 15), and the grayscale and the estimated illumination are input to Block 8 (selective normalization) in FIG. 15. In Block 8, the calibrated sensor image is normalized by a different method depending on the input.

Lastly, the contour of a touched area is determined by a general blob detection method (Block 9 in FIG. 15), and touch data is calculated (Block 10 in FIG. 15).

Figure 16:
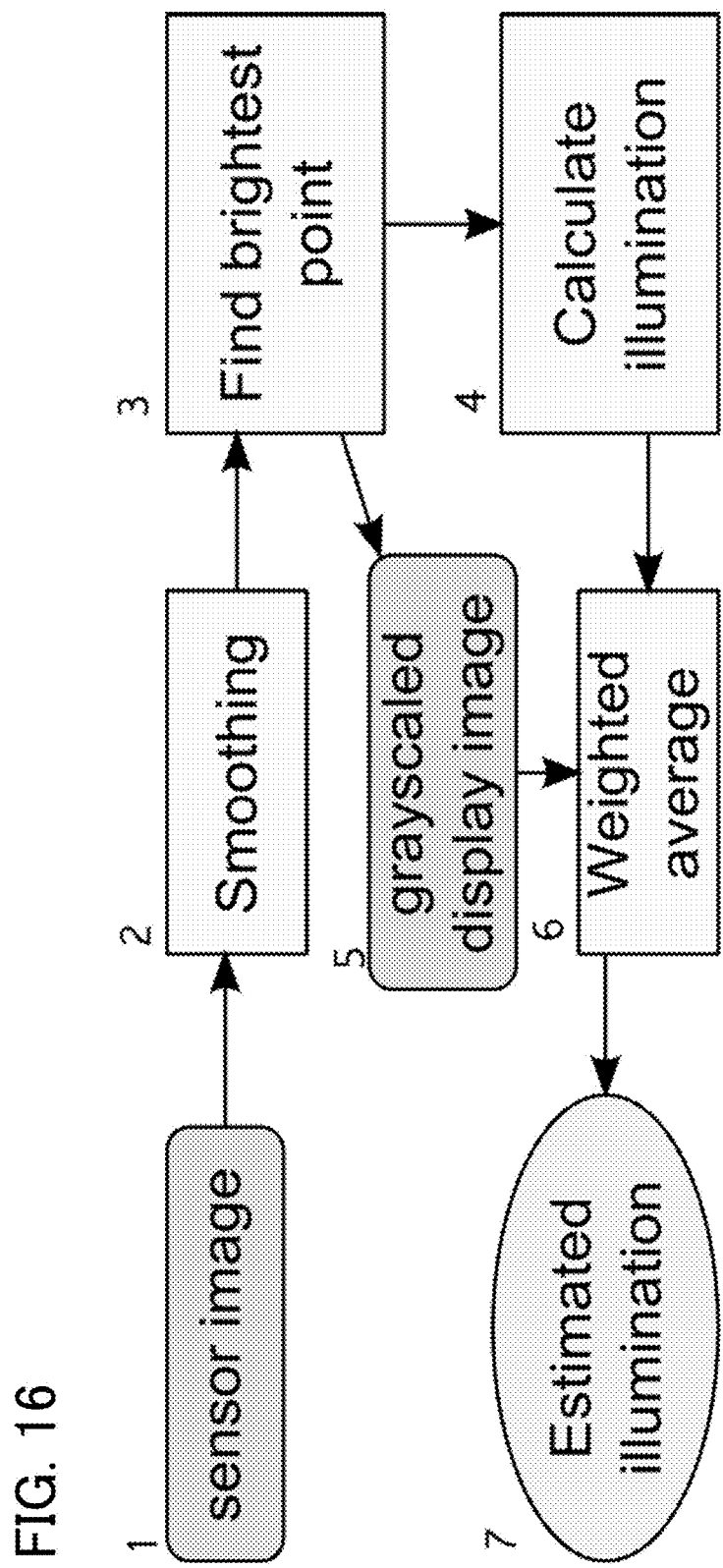
FIG. 16 is a flow chart of a program of one embodiment of the present invention.

Estimation of an illumination will be described. FIG. 16 shows an overview of illumination evaluation. To exclude sensor input values that are incorrectly determined, a sensor image is smoothed (Block 2 in FIG. 16) and then the maximum sensor input value is calculated (Block 3 in FIG. 16). The maximum value is used as a parameter of two different functions. The two functions correspond to a black display image and a white display image. These functions are obtained by approximation based on data acquired previously. The functions convert the sensor input value into two illuminations (Block 4 in FIG. 16). Finally, the pixel output value of a displayed image is determined using the point found in Block 3 in FIG. 16 (the point at which a sensor input value is maximum). A weighted average of the two illuminations obtained in Block 4 in FIG. 16 is calculated using the pixel output value (Block 6 in FIG. 16).

Furthermore, to stabilize an illumination when a user uses a display, the maximum illumination was used among recorded previous illuminations. In an experiment, illuminations were acquired at intervals of 0.5 seconds, and the latest five illuminations were used.

In the processing of Block 8 in FIG. 15, sensor input values after calibration ion and ioff (the former is the value when the light unit is on, and the latter is the value when the light unit is off) are normalized. Note that 0 and 1 indicate a full touching state and a no touching state, respectively. A processing for a pixel where white is displayed is simple. Specifically, 1−|ion−ioff| is calculated and a scale is changed into a linear shape.

As for a pixel where black is displayed, light from the light unit is absorbed by the pixel, so that the amount of light from the light unit that is reflected by a finger is small. Therefore, it is effective to consider an illumination. When an illumination is higher than a fixed parameter y, a difference due to shielding is large; thus, only ioff is used. When an illumination is lower than y, reflection of light from the light unit is sufficiently strong; thus, only ion is used. A sensor input value generated on a pixel where black is displayed becomes clear by increasing the degree of contrast to exclude a shade except that produced by a touch. Finally, a weighted average of two normalized values for the pixel where black is displayed and the pixel where white is displayed is calculated using the pixel output value of a display image.

The above algorithm was operated at 60 fps without utilizing GPU. The estimated illumination was not different from the actual illumination when a touch panel was used by 15% or more.

Figure 17:
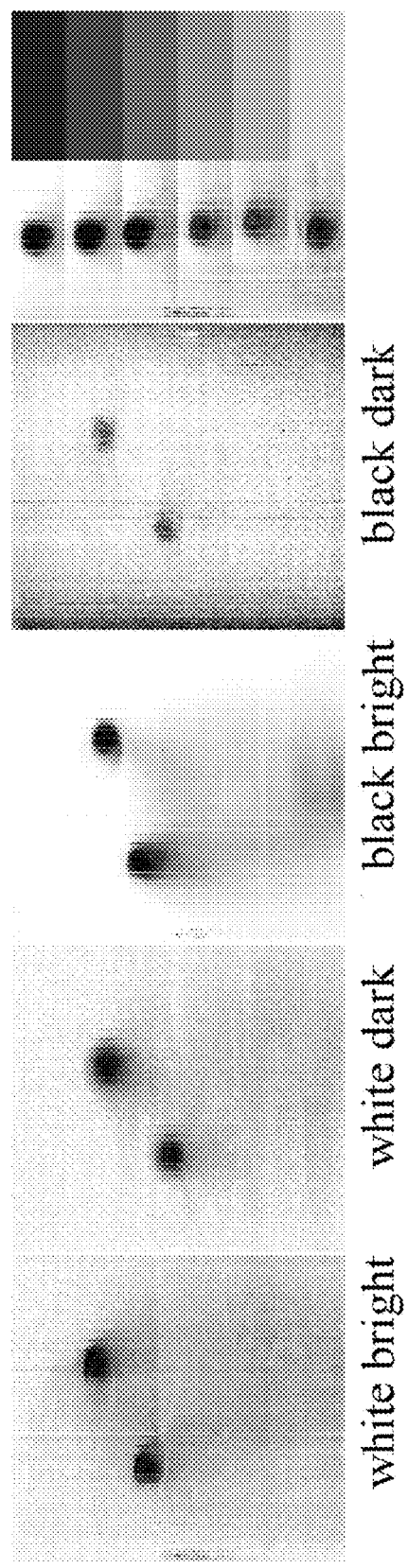
FIGS. 17A, 17B, 17C, 17D, and 17E are images containing touch levels each obtained by information processing.

FIGS. 17A to 17E show results obtained by performing image processings according to the program of one embodiment of the present invention that used the above algorithm. That is to say, FIGS. 17A to 17E show images containing touch levels obtained by data processings. FIG. 17A is a result obtained under bright ambient light when a white image is displayed. FIG. 17B is a result obtained under dark ambient light when a white image is displayed. FIG. 17C is a result obtained under bright ambient light when a black image is displayed. FIG. 17D is a result obtained under dark ambient light when a black image is displayed. FIG. 17E is a result obtained by performing image processings on six sensor images taken under bright ambient light with the grayscale of a display image changed.

As is shown in FIGS. 17A to 17E, when a white image is displayed, a touched area can be determined clearly regardless of the illumination. Even when a black image is displayed, a touched area can be clearly determined under bright ambient light. When the illumination is low, a touched area in a black display image is clear; however, a pattern due to a noise is seen. Furthermore, a dynamic range is narrowed. Overall, the algorithm is operated even in the state where an image other than a white image is displayed; thus, higher performance can be achieved compared with the case where ambient light and a display image are not considered.

Figure 20:
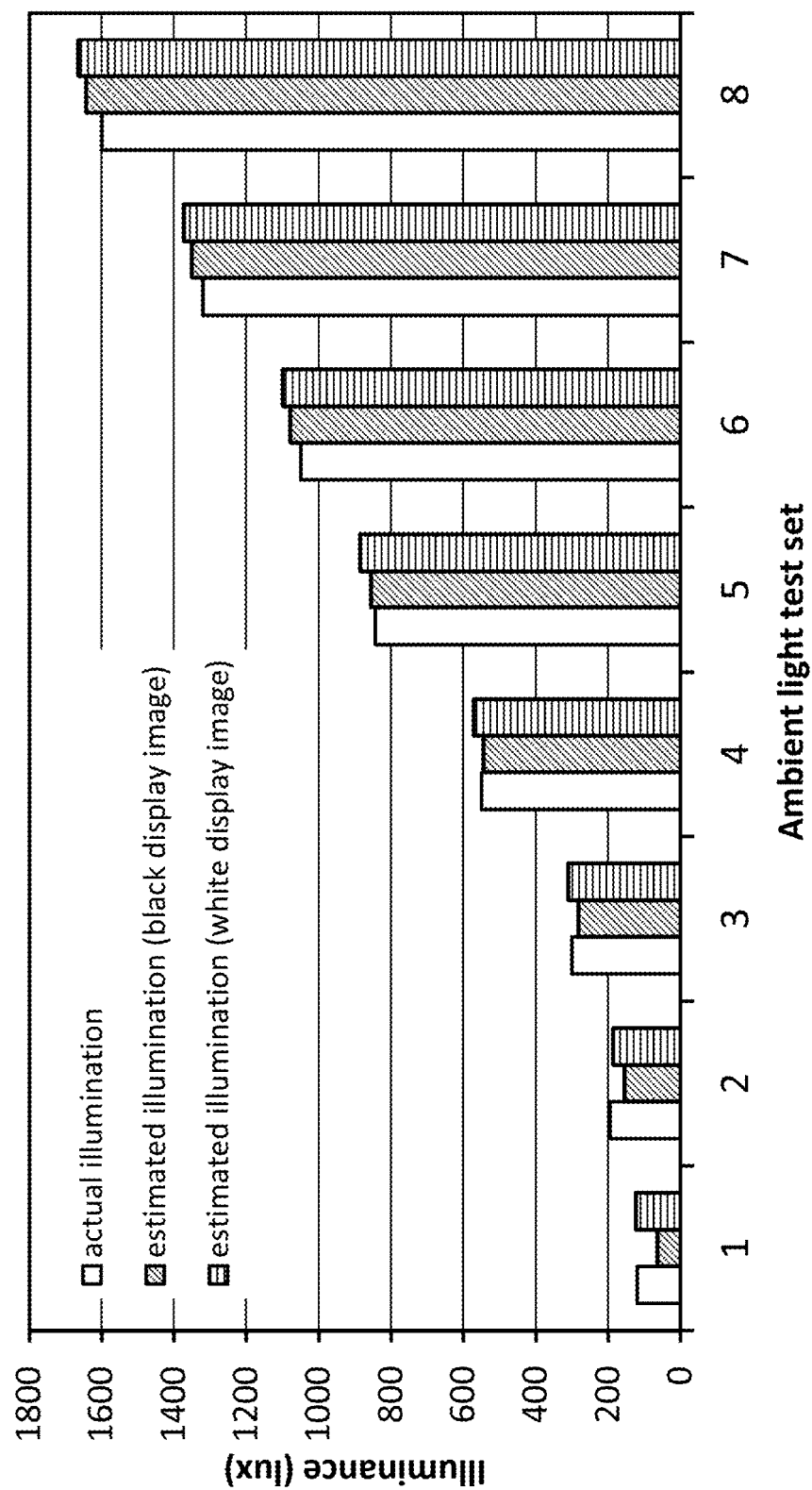
FIG. 20 is a graph showing estimated illuminations and measured illuminations

The illuminations of eight kinds of ambient light were estimated according to the algorithm shown in FIG. 16. FIG. 20 shows the estimated illuminations and illuminations measured with an illuminometer. The illuminations when a black image is displayed and those when a white image is displayed were estimated. Here, a fourth calibration sensor image was also fetched as a calibration image, and illuminations were estimated using the first to the fourth calibration images. The fourth calibration sensor image was fetched under the brightest ambient light when a black image was displayed.

Figure 21:
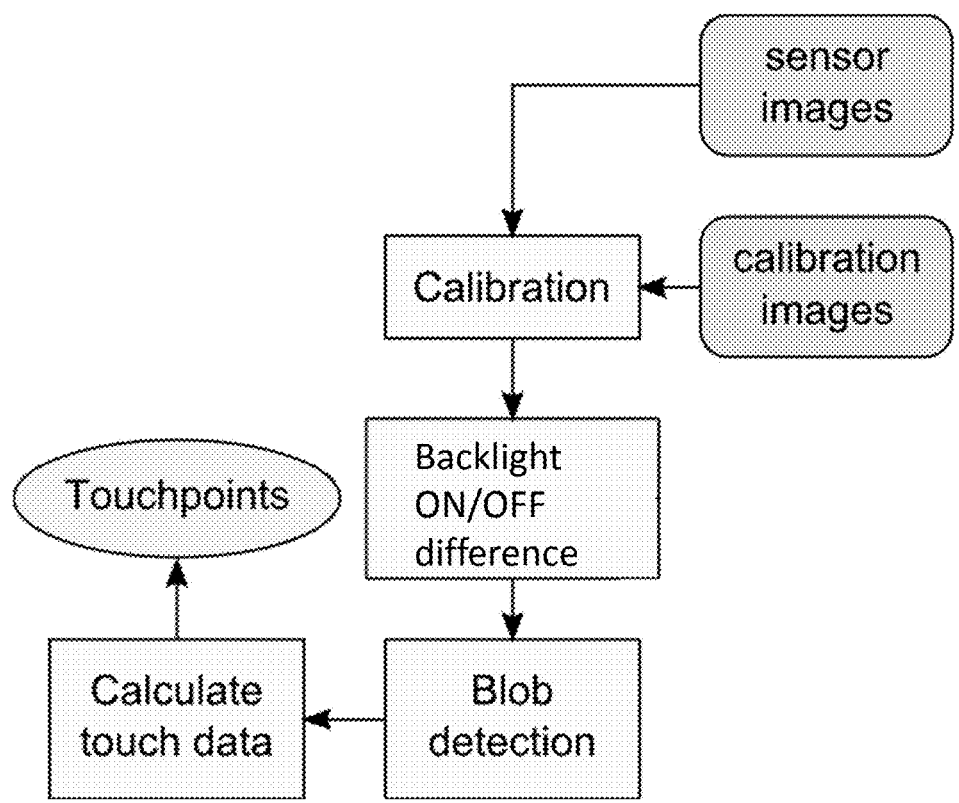
FIG. 21 is a flow chart of a comparative example.
Figure 22:
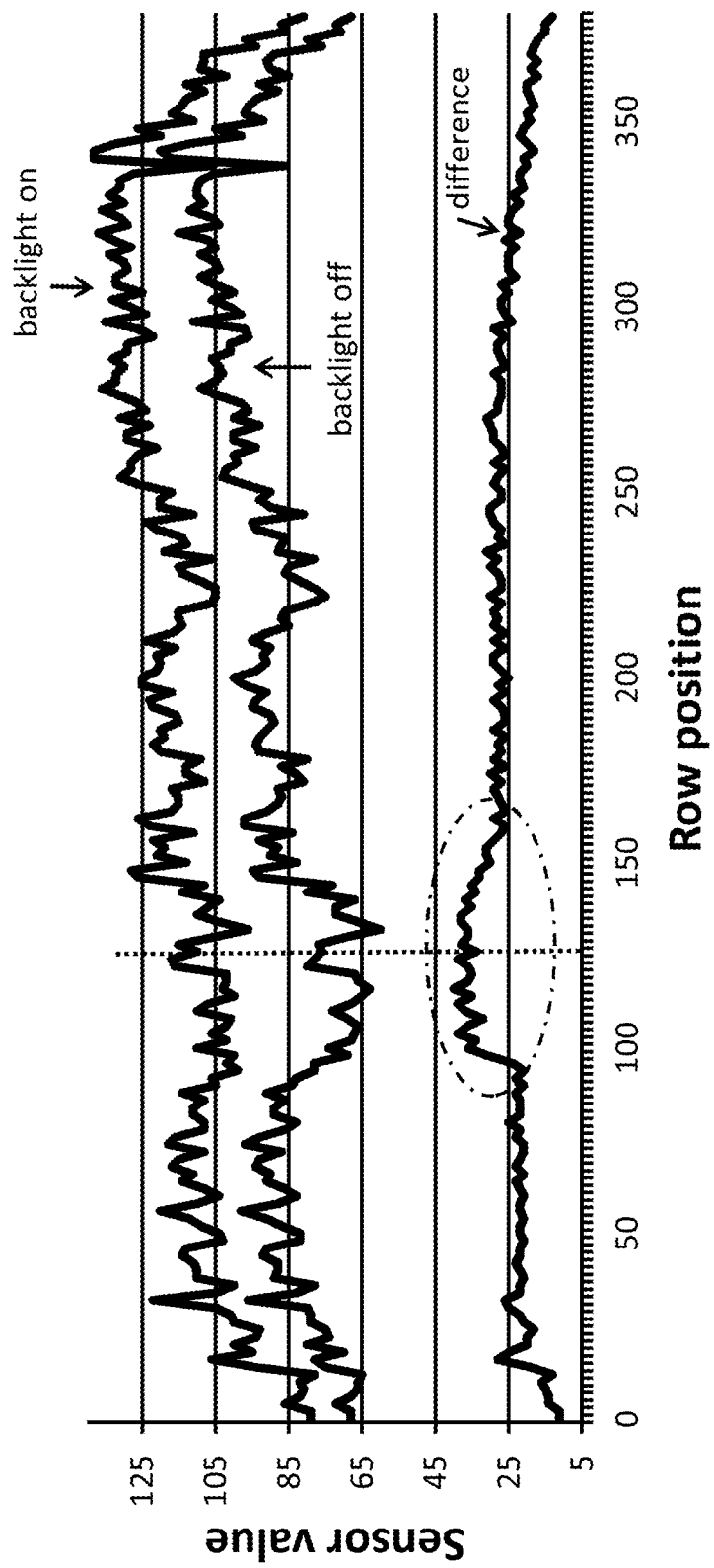
FIG. 22 is a graph showing sensor values when a backlight is on and when a backlight is off and differences thereof.

In a comparative example, a touch point was determined by a touch detection method using only a difference between a sensor image when the backlight is on and a sensor image when the backlight is off. FIG. 21 shows a flow chart of the touch detection method of the comparative example. FIG. 22 shows the sensor value of a row at the time when the light unit is on, the sensor value of the row at the time when the light unit is off, and a difference between the sensor values. A peak of a difference curve, which is surrounded by a dashed dotted line, indicates detection of a touched portion. An actual touched point is shown by a dotted line.

By the touch detection method of this example shown in FIG. 15 and the touch detection method of the comparative example shown in FIG. 21, tests for determining 128 touch points were performed. In both the methods, the same algorithm, a static threshold method, and a connected component method were used for actual touch detection. In the test performed by the touch detection method of this example, illuminations were estimated using the first to the fourth calibration images.

The algorithm of this example enabled determination of 105 correct touch points. In contrast, in the comparative example, 58 touch points were correctly determined. Furthermore, the number of touch points that were incorrectly determined with the algorithm of this example was 18, whereas 58 touch points were incorrectly determined in the comparative example. These results were obtained when 128 touch points with 0 to 1600 lux were determined in each of a black display image and a white display image.

As is described in this example, the program of one embodiment of the present invention using the algorithm allowed more stable and more accurate calculation of touch data when estimated illuminations and a display image were considered.

This application is based on Japanese Patent Application serial no. 2014-111367 filed with Japan Patent Office on May 29, 2014 and Japanese Patent Application serial no. 2014-153660 filed with Japan Patent Office on Jul. 29, 2014, the entire contents of which are hereby incorporated by reference.

What is claimed is:

1. An information processing device comprising:
a memory and an execution unit,
wherein the memory includes a program,
wherein the execution unit is configured to conduct the program,
wherein the program includes first to fourth steps,
wherein the first step includes a step of fetching a first sensor image at the time when a light unit is lighting and a second sensor image at the time when the light unit is not lighting,
wherein the second step includes:
  a step of calculating a third image by calibrating the first sensor image using a first calibration image; and
  a step of calculating a fourth image by calibrating the second sensor image using a second calibration image,
wherein the third step includes:
  a step of calculating fifth to seventh images using the third image and the fourth image; and
  a step of calculating an eighth image by obtaining a weighted average of the fifth to seventh images in accordance with an illumination and a display image,
wherein the fourth step includes a step of calculating touch data using the eighth image, and
wherein each of the fifth to seventh images is calculated by using both the third image and the fourth image.

2. The information processing device according to claim 1, further comprising in the program:
fifth to seventh steps,
wherein the fifth step includes:
  a step of fetching a third sensor image at the time when the light unit is not lighting,
wherein the sixth step includes a step of calculating a ninth image by deducting a third calibration image from the third sensor image,
wherein the seventh step includes:
  a step of calculating a tenth image by smoothing the ninth image;
  a step of finding a brightest component in the tenth image;
  a step of calculating estimated first and second illuminations using a value of the brightest component;
  a step of calculating an eleventh image by converting the display image into a gray scale; and
  a step of calculating an estimated third illumination by obtaining a weighted average of the estimated first and second illuminations in accordance with coordinates of the brightest component and the eleventh image, and
wherein the estimated third illumination is used as the illumination.

3. The information processing device according to claim 1, further comprising an optical touch panel.

4. The information processing device according to claim 1, wherein the illumination is an illumination under ambient light.

5. The information processing device according to claim 1, wherein the fifth image is a touch-level image assuming a white display, the sixth image is a touch-level image assuming a black display under light condition, and the seventh image is a touch-level image assuming a black display under dark condition.

* * * * *